US006578162B1

(12) United States Patent
Yung

(10) Patent No.: US 6,578,162 B1
(45) Date of Patent: Jun. 10, 2003

(54) ERROR RECOVERY METHOD AND APPARATUS FOR ADPCM ENCODED SPEECH

(75) Inventor: Hon Mo Yung, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/234,243

(22) Filed: Jan. 20, 1999

(51) Int. Cl.[7] .......... G06F 11/00

(52) U.S. Cl. .......... 714/708; 375/244; 375/351

(58) Field of Search .......... 714/708, 704, 714/705, 706, 707, 751, 758, 807, 812, 746, 747, 703, 800, 801; 375/254, 351, 217, 244, 331, 346, 249; 370/342; 455/63, 220, 225, 67.3, 524, 561; 381/94.5; 700/280; 341/143, 138–139, 155; 704/212, 228

(56) References Cited

U.S. PATENT DOCUMENTS

| | | | | | |
|---|---|---|---|---|---|
| 4,009,347 | A | * | 2/1977 | Flemming et al. | 370/321 |
| 5,309,443 | A | * | 5/1994 | Schorman | 714/708 |
| 5,319,573 | A | * | 6/1994 | Corleto et al. | 700/280 |
| 5,535,299 | A | | 7/1996 | Riedel | 704/212 |
| 5,623,355 | A | * | 4/1997 | Olsen | 359/110 |
| 5,732,356 | A | | 3/1998 | Bolt | 455/462 |
| 5,757,813 | A | * | 5/1998 | Raith | 714/708 |
| 5,768,291 | A | * | 6/1998 | Kelton et al. | 714/746 |
| 5,781,570 | A | * | 7/1998 | Hattori | 714/807 |
| 5,799,039 | A | * | 8/1998 | Laird et al. | 375/244 |
| 5,896,391 | A | * | 4/1999 | Solheim et al. | 714/704 |
| 5,928,379 | A | * | 7/1999 | Hattori | 714/807 |
| 5,974,584 | A | * | 10/1999 | Hendrickson et al. | 714/800 |
| 5,995,539 | A | * | 11/1999 | Miller | 375/222 |
| 6,047,036 | A | * | 4/2000 | Schnizlein | 375/351 |
| 6,157,811 | A | * | 12/2000 | Dent | 455/12.1 |

OTHER PUBLICATIONS

Ojala, P (Toll quality variable–rate speech codec ; IEEE, pp.: pp.: 747–750 vol. 2, Apr. 21–24, 1997).*

Kobayashi, K. et al. (High–quality signal transmission techniques for personal communication systems–novel coherent demodulation and ADPCM voice transmission with click noise processin; IEEE, pp.: On pp.: 733–737 vol. 2, Jul., 1995.*

Suzuki, T. et al. (A new speech processing scheme for ATM switching systems; IEEE, pp.: 1515–1519 vol. 3, Jun. 11–14, 1989).*

Shoji, Y. (A speech processing LSI for ATM network subscriber circuits; IEEE, pp.: 2897–2900 vol. 4, May 1–3, 1990).*

Kondo et al. (Packet speech transmission on ATM networks using a variable rate embedded ADPCM coding scheme; IEEE, pp.: 243–247, Feb.–Apr. 1994).*

Sriram, K. et al. (Voice over ATM using AAL2 and bit dropping: performance and call admission control ; IEEE, pp.: 215–224, May 26–29, 1998).*

(List continued on next page.)

*Primary Examiner*—Albert Decady
*Assistant Examiner*—Guy Lamarre
(74) *Attorney, Agent, or Firm*—Farjami & Farjami LLP

(57) ABSTRACT

A method and apparatus for reducing the audible “clicks” or “pops” which occur when an ADPCM encoding and decoding system is employed in a communications system in which communication occurs over a dispersive channel. A novel technique is employed in which ADPCM-encoded silence is substituted for error-containing frames, and post-processing is performed on decoded frames while a muting window is open.

35 Claims, 12 Drawing Sheets

OTHER PUBLICATIONS

CCITT Recommendation G.726, "40, 32, 24, 16 kbit/s Adaptive Differential Pulse Code Modulation (ADPCM)," Geneva, 1990.

"Reviews of Acoustical Patents", *The Journal of the Acoustical Society of America*, vol. 101, No. 5, Pt. 1, May 1997.

K. Enomoto, "A Very Low Power Consumption ADPCM Voice Codec LSIC for Personal Communication Systems," *5th IEEE International Symposium on Personal, Indoor and Mobile Radio Communications*, The Hague, The Netherlands, vol. II, 1994.

D. Goodman et al., "Waveform Substitution Techniques for Recovering Missing Speech Segments in Packet Voice Communications," *IEEE Transactions on Acoustics, Speech*, and Signal Processing, vol,. ASSP–34, No. 6, Dec. 1986.

H. D. Kim and C.K. Un, "An ADPCM System With Improved Error Control," *IEEE Global Telecommunications Conference*, San Diego, California vol. 3, 1983.

K. Kobayashi et al., "High–quality Signal Transmission Techniques for personal Communication Systems—Novel Coherent Demodulation and ADPCM Voice Transmission with Click Noise Processing, *IEEE 45th Vehicular Technology Conference*, " Chicago, Illinois, 1995.

S. Kubota et al., "Improved ADPCM Voice Transmission Employing Click Noise Detection Scheme For TDMA–TDD Systems," *The Fourth International Symposium on Personal, Indoor and Mobile Radio Communications*, Yokohama, Japan, 1993.

B. Ruiz–Mezcua et al., "Improvements In The Speech Quality For A DECT System," *IEEE 47th Vehicular Technology Conference*, Phoenix AZ 1997.

O. Nakamura et al., "Improved ADPCM Voice Transmission for TDMA–TDD Systems," *43rd IEEE Vehicular Technology Conference*, Secaucus, New Jersey, 1993.

V. Varma et al., "Performance of 32 Kb/s ADPCM In Frame Erasures," *IEEE 44th Vehicular Technolgy Conference*, Stockholm, Sweden, 1994.

K. Yokota et al., "A New Missing ATM Cell Reconstruction Scheme For ADPCM–Encoded Speech," *IEEE Global Telecommunications Conference & Exhibition*, Dallas, Texan, vol. 3, 1989.

ADPCM Codecs, http://www–mobile.ecs.soton.ac.uk/speech_codecs/standards/adpcm.html.

* cited by examiner

Non-linear Processing Characteristics Equation

ERROR RECOVERY METHOD AND APPARATUS FOR ADPCM ENCODED SPEECH

I. BACKGROUND OF THE INVENTION

The present invention relates generally to error recovery for encoded speech in a digital communication system, and more specifically, to error recovery for speech signals encoded using adaptive differential pulse code modulation (ADPCM).

Encoders and decoders are commonly employed in communication systems for the purpose of compressing and decompressing speech signals. Adaptive Differential Pulse Code Modulation (ADPCM) describes a form of encoding speech signals in a digital communication system in which compression ratios of 2:1 or even 4:1, with respect to 8-bit compressed PCM samples, can be achieved with relatively low levels of complexity, delay, and speech degradation. In the last few years, this form of encoding has been incorporated into various Personal Communication System (PCS) standards, including the Japanese Personal Handi-Phone System (PHS) and European Digital European Cordless Telecommunications (DECT) standards. It has also become the de facto standard in the United States for the coding of speech in cordless telecommunications systems. The particular form of ADPCM employed in these systems is described in CCITT Recommendation G.726, "40, 32, 24, 16 kbit/s ADAPTIVE DIFFERENTIAL PULSE CODE MODULATION (ADPCM)," Geneva, 1990 (hereinafter referred to as "CCITT Recommendation G.726"), which is hereby fully incorporated by reference herein as though set forth in full.

A problem arises because this G.726 standard was developed for terrestrial wireline applications, not radio frequency (RF) systems employing dispersive channels, such as the foregoing PHS and DECT cordless systems, and wireless systems, such as digital PCS, in which the channel error rate experienced is typically much greater due to factors such as interference from other users and multipath fading. More specifically, a G.726 ADPCM decoding and encoding system quickly degrades when subjected to such error rates. Consequently, audible "clicks" or "pops" occur when speech passing through such a system is played over a speaker. This problem stems from the structure of the G.726 ADPCM encoder and decoder, which will now be explained.

A block diagram of a G.726 compliant encoder is illustrated in FIG. 1. As can be seen, this encoder comprises Input PCM Format Conversion Block 1, Difference Signal Computation Block 2, Adaptive Quantizer 3, Inverse Adaptive Quantizer 4, Reconstructed Signal Calculator 5, Adaptive Predictor 6, Tone And Transition Detector 7, Adaptation Speed Control Block 8, and Quantizer Scale Factor Adaptation Block 9, coupled together as shown. This figure and the following explanation is taken largely from CCITT Recommendation G.726. This encoder receives as input pulse-code modulated (PCM) speech samples, s(k), and provides as output ADPCM samples I(k). In one implementation, in which the mode of transmission is analog transmission, the PCM samples, s(k), are uniform PCM samples. In one example of this implementation, the PCM samples are 14-bit uniform samples which range from −8192 to +8191. In this implementation, Block 1 can be eliminated since the PCM samples are already in a uniform format. In another implementation, in which the mode of transmission is digital transmission, the PCM samples are A-law or $\mu$-law samples. In one example of this implementation, the PCM samples are compressed 8-bit samples. The output ADPCM samples, I(k), are generated from an adaptively quantized version of the difference signal, d(k), which is the difference between the uniform PCM signal, $s_1(k)$, and an estimated signal, $s_e(k)$, provided by Block 6. In these variables, k is the sampling index. In one embodiment, the sampling interval is 125 $\mu$s. A basic assumption is that $s_e(k)$ can be precisely recreated at the decoder in order to regenerate the speech signal from received values of I(k).

Optional block 1 converts the input signal s(k) from A-law or $\mu$-law format to a uniform PCM signal $s_1(k)$. Block 2 outputs a difference signal, d(k), equal to $s_1(k)-s_e(k)$. Block 3 is a non-uniform adaptive quantizer used to quantize d(k) using an adaptively quantized scale factor, y(k), output from Block 9. This quantizer operates as follows. First, the input d(k) is normalized using the following equation: $\log_2|d(k)|-y(k)$. Then, a value for the output I(k)is determined responsive to this normalized input. In one embodiment, in which the output is selected to be at the rate 32 kbit/s, each output value is four bits, three bits for the magnitude and one bit for the sign, specifying one of sixteen quantization levels as determined by the following table:

| Normalized quantizer input range: $\log_2\|d(k)\| - y(k)$ | $\|I(k)\|$ | Normalized quantizer output $\log_2\|d_q(k)\| - y(k)$ |
|---|---|---|
| [4.31, +∞] | 15 | 4.42 |
| [4.12, 4.31) | 14 | 4.21 |
| [3.91, 4.12) | 13 | 4.02 |
| [3.70, 3.91) | 12 | 3.81 |
| [3.47, 3.70) | 11 | 3.59 |
| [3.22, 3.47) | 10 | 3.35 |
| [2.95, 3.22) | 9 | 3.09 |
| [2.64, 2.95) | 8 | 2.80 |
| [2.32, 2.64) | 7 | 2.48 |
| [1.95, 2.32) | 6 | 2.14 |
| [1.54, 1.95) | 5 | 1.75 |
| [1.08, 1.54) | 4 | 1.32 |
| [0.52, 1.08) | 3 | 0.81 |
| [−0.13, 0.52) | 2 | 0.22 |
| [−0.96, −0.13) | 1 | −0.52 |
| (−∞, −0.96) | 0 | −∞ |

Block 4 provides a quantized version of the difference signal, $d_q(k)$, from I(k) in accordance with the foregoing table. More specifically, through an inverse quantization process, a normalized quantizer output in the rightmost column of the table is selected based on the value of I(k). Then, referring to this value as N.O., $d_q(k)$ is determined using the following equation: $|d_q(k)|=2^{|N.O.|+y(k)}$, in which N.O. is the normalized quantizer output. Because of quantization error, the signal $d_q(k)$ will typically differ from d(k).

Block 9 adaptively computes the scale factor, y(k), in part based on past values of y(k). More specifically, a fast (unlocked) scale factor $y_u(k)$ is computed using the following equation: $y_u(k)=(1-2^{-5})y(k)+2^{-5}W[I(k)]$. For 32 kbit/s ADPCM, the function W[I(k)] is defined as follows:

| \|I(k)\| | 7 | 6 | 5 | 4 | 3 | 2 | 1 | 0 |
|---|---|---|---|---|---|---|---|---|
| W[I(k)] | 70.13 | 22.19 | 12.38 | 7.00 | 4.00 | 2.56 | 1.13 | −0.75 |

Thus, higher magnitude values of I(k) are weighted significantly more heavily than lower magnitude values of I(k).

A slow (locked) scale factor $y_l(k)$ is derived from $y_u(k)$ using the following equation: $y_l(k)=(1-2^{-6})y_l(k-1)+2^{-6}y_u$ $(k)$. The fast and slow scale factors are then combined to form y(k) using the adaptive speed control factor $a_1(k)$ provided from Block 8, where $0 \leqq a_1(k) \leqq 1$. The following equation describes the specific relationship between these variables: $y(k)=a_1(k)y_u(k-1)+[1-a_1(k)]y_l(k-1)$.

The parameter $a_1(k)$ provided by Block 8 can assume values in the range [0,1]. It tends towards unity for speech signals, and towards zero for voiceband data signals. To compute this parameter, two measures of the average magnitude of I(k), $d_{ml}(k)$ and $d_{ms}(k)$, are computed using the following equations:

$$d_{ms}(k)=(1-2^{-5})d_{ms}(k-1)+2^{-5}F[I(k)]$$

$$d_{ml}(k)=(1-2^{-7})d_{ml}(k-1)+2^{-7}F[I(k)]$$

For 32 kbit/s ADPCM, F[I(k)] is defined by:

| \|I(k)\| | 7 | 6 | 5 | 4 | 3 | 2 | 1 | 0 |
|---|---|---|---|---|---|---|---|---|
| F[I(k)] | 7 | 3 | 1 | 1 | 1 | 0 | 0 | 0 |

Thus, $d_{ms}(k)$ is a relatively short-term average of F[I(k)], and $d_{ml}(k)$ is a relatively long-term average of F[I(k)]. Using these two averages, the variable $a_p(k)$ is computed. The variable $a_p(k)$ tends towards the value of 2 if the difference between $d_{ms}(k)$ and $d_{ml}(k)$ is large (average magnitude of I(k) changing) and tends towards the value of 0 if the difference is small (average magnitude of I(k) relatively constant). Further details about the computation of $a_p(k)$ are contained in the CCITT Recommendation G.726. The parameter $a_p(k-1)$ is then limited to yield $a_1(k)$ in accordance with the following equation:

$$a_1(k) = \begin{Bmatrix} 1, & a_p(k-1) > 1 \\ a_p(k-1), & a_p(k-1) \leq 1 \end{Bmatrix}$$

The primary function of Adaptive Predictor 6 is to compute the signal estimate $s_e(k)$ from the quantized difference signal, $d_q(k)$, in accordance with the following equations:

$$s_e(k) = \sum_{i=1}^{2} a_i(k-1)s_r(k-i) + s_{ez}(k), \quad \text{where}$$

$$s_{ez}(k) = \sum_{i=1}^{6} b_i(k-1)d_q(k-i)$$

The computation of the predictor coefficients, $a_i$ and $b_i$, is described in the CCITT Recommendation G.726. As can be seen, the computation includes a sixth order section that models zeroes, and a second order section that models poles, in the input signal. This dual structure accommodates a wide variety of input signals which may be encountered. Note that because $s_e(k)$ is derived in part from $d_q(k)$, quantization error is accounted for in the derivation of $s_e(k)$.

Block 5 computes the reconstructed signal, $s_r(k)$, in accordance with the following equation:

$$s_r(k-i)=s_e(k-i)+d_q(k-i)$$

Block 7 provides the variables $t_r(k)$ and $t_d(k)$ responsive to the predictor coefficient $a_2(k)$ determined in block 6. The variables $t_r(k)$ and $t_d(k)$ as determined in Block 7 are used in Block 8 for the computation of $a_p(k)$, and thus $a_1(k)$.

In one embodiment, the input signal, s(k), is a 64 kbit/s A-law or $\mu$-law PCM signal, with each sample of s(k) consisting of an 8-bit word. In this embodiment, the output signal, I(k), is a 32 kbit/s signal, representing a compression ration of 2:1. In this embodiment, each sample of I(k) is a 4-bit word, three bits for the magnitude and one for the phase. In another embodiment, the input signal, s(k), is a uniform PCM signal, with each sample of s(k) consisting of a 14-bit word.

A block diagram of a G.726 compliant decoder is illustrated in FIG. 2. As indicated, this decoder comprises Inverse Adaptive Quantizer 10, Reconstructed Signal Calculator 11, Output PCM Format Conversion Block 12, Synchronous Coding Adjustment Block 13, Adaptive Predictor 14, Quantizer Scale Factor Adaptation Block 15, Adaptation Speed Control Block 16, and Tone And Transition Detector 17, coupled together as shown. The input to the decoder is the ADPCM-encoded signal I(k) after transmission over a channel, and the output is $s_d(k)$, a signal in PCM format. In one embodiment, in which the ADPCM-encoded signal I(k) is encoded at 32 kbit/s, each sample of I(k), as discussed, is four bits, with three bits representing the magnitude and one bit representing the phase. In one embodiment, the output signal, $s_d(k)$, is a uniform PCM signal, with each sample of $s_d(k)$ consisting of a 14-bit word.

The function of many of the blocks in FIG. 2 can be described in relation to corresponding blocks in FIG. 1. More specifically, the function of Block 10 in FIG. 2 is identical to that of Block 4 in FIG. 1; the function of Block 11 in FIG. 2 is identical to that of Block 5 in FIG. 1; the function of Block 14 in FIG. 2 is identical to that of Block 3 in FIG. 1; the function of Block 15 in FIG. 2 is identical to that of Block 9 in FIG. 1; the function of Block 16 in FIG. 2 is identical to that of Block 8 in FIG. 1; and the function of Block 17 in FIG. 2 is identical to that of Block 7 in FIG. 1.

Block 12 converts $s_r(k)$ to A-law or $\mu$-law signal $s_p(k)$. In Block 13, A-law or $\mu$-law signal $s_p(k)$ is first converted to a uniform PCM signal $s_{lx}(k)$, and then a difference signal, $d_x(k)$, is computed in accordance with the following equation:

$$d_x(k)=s_{lx}(k)-s_e(k)$$

The difference signal $d_x(k)$, is then compared to the ADPCM quantizer decision interval determined by I(k) and y(k). Based on this, the signal $s_d(k)$, the output signal the decoder, is determined as follows:

$$s_d(k) = \begin{Bmatrix} s_p^+(k), & d_x(k) < \text{lower boundary interval} \\ s_p^-(k), & d_x(k) \geq \text{upper boundary interval} \\ s_p(k), & \text{otherwise} \end{Bmatrix}$$

where $s_p^+(k)$ is the PCM code word that represents the next more positive PCM output level (if $s_p(k)$ represents the most positive output level, then $s_p^+(k)$ is constrained to be $s_p(k)$); and $s_p^-(k)$ is the PCM code word that represents the next more negative PCM output level (if $s_p(k)$ represents the most negative PCM output level, then $s_p^-(k)$ is constrained to be the value $s_p(k)$).

Thus, in the foregoing system, it can be seen that the ADPCM encoded speech is a signal, I(k), the samples of which are the quantization of $\log_2$ of the difference signal d(k), equal to the difference between the speech signal s(k) and a predicted speech signal $s_e(k)$, less a quantizer scale factor y(k), which is adaptively determined based on past samples of I(k). In other words, $I(k)=QUANT[\log_2(d(k))-$ y(k)]. It is important to note that the scale factor y(k) is subtracted from the $\log_2$ form of the difference signal d(k), and thus is best characterized as being in the $\log_2$ domain.

At the decoder, the samples I(k) are received after transmission through a channel. Since errors will typically be introduced by the channel, the received samples will typically differ from I(k) as produced by the encoder. Thus, although these samples are still referred to as I(k), it should be understood that they typically differ from I(k) as produced by the encoder.

An attempt is then made in the decoder to recreate the quantizer scale factor y(k) from past values of I(k) as received at the decoder. Because of errors introduced by the channel, the recovered quantizer scale factor, which is also referred to as y(k), may differ from y(k) as determined at the encoder.

Through an inverse quantizer, the decoder then recreates a difference signal $d_q(k)$ in accordance with the following equation: $d_q(k)=2^{(IQUANT[I(k)+y(k)]}$. The underlying speech is then recovered by adding the current value of $d_q(k)$ to an estimate $s_e(k)$ of the speech prepared from past values of $d_q(k)$ as determined at the decoder.

It should be appreciated from the foregoing that since y(k) is in the $\log_2$ domain, any divergence of y(k) from its correct value is magnified exponentially in the reconstructed speech signal, that is, by $2^{\Delta y(k)}$, where $\Delta y(k)$ refers to the deviation of y(k) from its correct value.

It should also be appreciated that y(k), which is determined from past values of I(k), is heavily and disproportionally influenced by past values of I(k) having a large magnitude. The reason is that, as discussed previously, the fast (unlocked) component of y(k), $y_u(k)$, is computed using the following equation: $y_u(k)=(1-2^{-5})y(k)+2^{-5}W[I(k)]$, and the weights W[I(k)] are much greater for large magnitude values of I(k) than for small magnitude values of I(k). By way of example, for 32 kbit/s ADPCM, the function W[I(k)] is defined as follows:

| \|I(k)\| | 7 | 6 | 5 | 4 | 3 | 2 | 1 | 0 |
|---|---|---|---|---|---|---|---|---|
| W[I(k)] | 70.13 | 22.19 | 12.38 | 7.00 | 4.00 | 2.56 | 1.13 | −0.75 |

It can be seen that higher magnitude values of I(k) are weighted significantly more heavily in the computation than lower magnitude values of I(k).

With the foregoing as background, the problems encountered through use of an ADPCM encoding and decoding system in a wireless or cordless communications system will now be explained. Errors introduced by the communication channel cause the samples of I(k) being transmitted over the channel to deviate from their correct values. This in turn causes the adaptive scale factor y(k) reconstructed at the decoder to deviate from the value of y(k) as determined at the encoder.

Error-containing samples of I(k) having large magnitudes are particularly problematic because of the disproportionate effect these samples have on the reconstruction of y(k). The large mismatch in y(k) due to these errors is compounded because of the exponential effect mismatches in y(k) have on the difference signal $d_q(k)$ determined at the decoder, according to which a mismatch of $\Delta y(k)$ is reflected in $d_q(k)$ through the multiplier $2^{\Delta y(k)}$. These mismatches can and frequently do cause the signal $d_q(k)$ as determined at the decoder to deviate significantly from the signal $d_q(k)$ as determined at the encoder.

The estimated speech signal, $s_e(k)$, determined at the decoder in turn is caused to deviate from the signal $s_e(k)$ as determined at the encoder. The end result is that the reconstructed speech as determined at the decoder in not an accurate estimate of the underlying speech signal at the decoder, and in fact, tends to have much higher energy than this underlying speech. This results in the audible “clicks” or “pops” which arise when this reconstructed speech is passed through a speaker.

This problem is particularly pervasive because not only do the channel errors have degrading effects on the portion of the speech decoded roughly contemporaneously with the occurrence of these errors, but, due to the dependence of y(k) on past values of I(k), these errors have effects which propagate over many sample periods. Empirical studies have shown that, during high error conditions, y(k) attains values up to three times higher than the peak values of y(k) attained under zero error conditions, and maintains these high values for long periods of time, rather than reaching a peak and quickly declining as experienced in zero-error conditions. Consequently, these channel errors may impact and even cause the loss of entire frames or packets (typically hundreds of bits) of coded speech.

Various approaches have been proposed for dealing with the problem. According to one approach, various modifications are proposed to the G.726 encoding and decoding algorithms to make them more robust to channel errors. See H. D. Kim and C. K. Un, “An ADPCM System With Improved Error Control,” IEEE Global Telecommunications Conference, San Diego, Calif., Vol. 3, 1983, at 1369, which is incorporated by reference herein as though set forth in full. Since most PCS systems specify that the G.726 standard be followed exactly, this approach is not generally suitable.

Another approach, known as waveform substitution, involves the replacement of error-containing segments with replacement segments determined through various approaches, such as pattern matching or pitch detection or estimation performed on previous segments. See D. Goodman et al., “Waveform Substitution Techniques for Recovering Missing Speech Segments in Packet Voice Communications,” IEEE Transactions on Acoustics, Speech, and Signal Processing, Vol. ASSP-34, No. 6, December 1986, at 1440 and K. Yokota et al., “A New Missing ATM Cell Reconstruction Scheme For ADPCM-Encoded Speech,” IEEE Global Telecommunications Conference & Exhibition, Dallas, Tex., Vol. 3, 1989, at 1926, which are both incorporated by reference herein as though set forth in full. The problem with these approaches is that, due to their complexity and memory requirements, they are generally too costly for implementation in low-cost and high-volume electronic devices, such as cordless or wireless handsets. Moreover, they do not generally provide acceptable speech quality.

A third approach, described in Riedel, U.S. Pat. No. 5,535,299, Jul. 9, 1996, which is incorporated by reference herein as though set forth in full, involves magnitude limiting or clipping received ADPCM-encoded error-containing speech segments based on threshold comparisons, with clipping performed prior to ADPCM-decoding. A similar approach is described in Schorman, U.S. Pat. No. 5,309,443, May 3, 1994, which is incorporated by reference herein as though set forth in full, in which ADPCM-decoded error-containing speech segments are magnitude-limited or clipped with the degree of clipping determined responsive to the quality of the received segment. The problem with these approaches is that they do not generally provide acceptable speech quality.

A fourth approach, described in O. Nakamura et al., “Improved ADPCM Voice Transmission for TDMA-TDD Systems," $43^{rd}$ IEEE Vehicular Technology Conference, Secaucus, N.J., 1993, at 301; S. Kubota et al., "Improved ADPCM Voice Transmission Employing Click Noise Detection Scheme For TDMA-TDD Systems," The Fourth International Symposium on Personal, Indoor and Mobile Radio Communications, Yokohama, Japan, 1993, at 1993; K. Enomoto, "A Very Low Power Consumption ADPCM Voice Codec LSIC for Personal Communication Systems," $5^{th}$ IEEE International Symposium on Personal, Indoor and Mobile Radio Communications, The Hague, The Netherlands, Vol. II, 1994, at 481; and K. Kobayshi, "High-quality Signal Transmission Techniques for Personal Communication Systems—Novel Coherent Demodulation and ADPCM Voice Transmission with Click Noise Processing," IEEE $45^{th}$ Vehicular Technology Conference," Chicago, Ill., 1995, at 733, all of which are hereby incorporated by reference herein as though set forth in full, involves two steps. In the first step, prior to passage through an ADPCM decoder, ADPCM-encoded segments containing errors are detected through cyclic redundancy code (CRC) error detection, and then muted, that is, replaced with zero-difference signals. In the second step, a click noise detector attempts to detect the presence of click noise by monitoring 1) the high frequency content and overflow condition of the PCM signal output from the ADPCM decoder, and 2) the CRC error status of the ADPCM-encoded signal input to the ADPCM decoder. Responsive to the output of the click noise detector, a PCM suppression circuit suppresses the click noise in the PCM signal.

A problem with this approach stems from the complexity of the circuit for detecting the presence of click noise, which makes it generally unsuitable for low-cost and high-volume applications such as cordless or wireless handsets. A second problem relates to the critical threshold comparisons relied on for click noise detection. In order to achieve satisfactory performance, these thresholds must be adaptively determined from the received signal. Yet, no established algorithm has been found applicable for this purpose. A third problem stems from the filtering process which is relied on for click noise detection. Such a filtering process tends to be too time-consuming for general use in ADPCM communications systems due to the real time demands of such a system.

A fifth approach, described in V. Varma et al., "Performance of 32 kb/s ADPCM in Frame Erasures," IEEE $44^{th}$ Vehicular Technology Conference, Stockholm, Sweden, 1994, Vol. 2, at 1291, which is hereby incorporated by reference herein as though set forth in full, involves silence substitution, that is, replacing an erroneous frame with a frame at the lowest quantization level. The problem with this approach is that it has been found to actually introduce click noise into the speech signal. Consequently, the speech quality obtained with such an approach has not been considered suitable.

A sixth approach, described in B. Ruiz-Mezcua et al., "Improvements In The Speech Quality For A DECT System," IEEE $47^{th}$ Vehicular Technology Conference, Phoenix, Ariz., 1997, which is hereby fully incorporated by reference herein as though set forth in full, involves replacing, upon the detection of a channel error condition, an erroneous speech frame by a selected one of 1) the previous speech frame, 2) an attenuated frame, and 3) a comfort noise frame, depending on the status of the channel and the mute algorithm decision. However, this approach is undesirable because of its complexity and because the speech quality which is achieved is not generally considered suitable.

A seventh approach, described in Bolt, U.S. Pat. No. 5,732,356, Mar. 24, 1998, which is hereby incorporated by reference herein as though set forth in full, involves the use of a cyclic buffer to successively store frames of ADPCM-encoded speech, and, upon the detection of an error condition, outputting the stored frames to the ADPCM decoder in the reverse order of their storage. A problem with this approach is that the cost and complexity of the cyclic buffer makes it generally unsuitable for use in low-cost and high-volume electronic devices such as cordless or wireless handsets. A second problem is that the operation of the cyclic buffer is generally too time-consuming for the real time demands of a communications system.

Accordingly, there is a need for an error recovery method and apparatus for ADPCM-encoded speech which is suitable for use in communications systems involving dispersive channels, such as cordless or wireless channels.

There is also a need for an error recovery method and apparatus for ADPCM-encoded speech which is suitable for low-cost and high-volume applications, such as cordless or wireless handsets.

There is further a need for an error recovery method and apparatus for ADPCM-encoded speech which overcomes the disadvantages of the prior art.

Objects and advantages of the subject invention include any of the foregoing, singly or in combination. Further objects and advantages will be apparent to those of skill in the art, or will be set forth in the following disclosure.

II. SUMMARY OF THE INVENTION

In accordance with the purpose of the invention as broadly described herein, there is provided a method and apparatus for reducing the audible "clicks" or "pops" which occur when an ADPCM encoding and decoding system is employed in a communications system in which communication occurs over a dispersive channel. A novel technique is employed in which, prior to ADPCM decoding, ADPCM-encoded silence is substituted for error-containing frames, and then, subsequent to ADPCM decoding, post-processed decoded frames are provided to an output while a muting window is open, and decoded frames not subject to the post-processing are provided to the output when the muting window is closed.

In one embodiment, a communications system is provided comprising a plurality of mobile units configured to communicate with corresponding ones of a plurality of base stations or satellites over a dispersive channel, at least one such mobile unit, base station, or satellite including apparatus for performing error recovery of ADPCM-encoded speech frames comprising:

a detector for detecting an error in a ADPCM-encoded speech frame;

an ADPCM decoder for decoding ADPCM-encoded speech frames;

a substitution block for substituting a first predetermined frame for a second ADPCM-encoded frame responsive to the detector detecting an error in the second frame;

a post-processor for post-processing decoded frames;

a muting window generator for opening a muting window responsive to the detector detecting an error in an ADPCM-encoded frame and closing the window after a predetermined number of error-free frames have been received;

an output; and a switch configured to provide to the output post-processed decoded frames while the muting window is open, and provide to the output decoded frames not subject to or subject to only part of the post-processing while the muting window is closed.

In other embodiments, related apparatus, methods and computer-readable media are provided, such as apparatus, which may be a mobile handset, a receive path in a mobile handset, a base station, a receive path in a base station, a PCS device, an infrastructure component of a communications system, or the like, for performing error recovery of ADPCM-encoded speech frames comprising:

- a detector for detecting an error in a ADPCM-encoded speech frame;
- an ADPCM decoder for decoding ADPCM-encoded speech frames;
- a substitution block for substituting a first predetermined frame for a second ADPCM-encoded frame responsive to the detector detecting an error in the second frame;
- a post-processor for post-processing decoded frames;
- a muting window generator for opening a muting window responsive to the detector detecting an error in an ADPCM-encoded frame and closing the window after a predetermined number of error-free frames have been received;
- an output; and
- a switch configured to provide post-processed decoded frames to the output while the muting window is open, and to provide to the output decoded frames not subject to or subject to only part of the post-processing while the muting window is closed.

In one implementation example, the post-processor includes a non-linear processor and a programmable attenuation profiler. In another implementation example, the non-linear processor is a compander, and the programmable attenuation profiler attenuates decoded frames at an attenuation level which starts out at a level less than one, and then progressively rises to a value greater than one, and then progressively decreases to a value of one during the time that the muting window is open.

Other similar methods and apparatus are also provided, including a method for post-processing decoded ADPCM audio frames after an erroneous audio frame has been detected and muted, the method comprising the following steps:

(a) opening a mute window;

(b) providing to an output post-processed decoded frames while the mute window is open;

(c) providing to the output decoded frames not subject to or subject to only part of the post-processing while the mute window is closed; and (d) closing the mute window after at least one frame subsequent to the erroneous frame has been decoded, post-processed, and provided to the output.

Also included is a method for improving the voice quality of an ADPCM coded signal received by a digital RF receiver comprising the following steps:

(a) generating audio frames of ADPCM code words from said coded signal;

(b) for each said audio frame, detecting whether an error exists in said audio frame;

(c) if an error is detected, muting said frame, decoding said frame with an ADPCM decoder, performing post-processing on the decoded frame and subsequent decoded frames output by said decoder, and supplying said post-processed frames to an output; and (d) if no error is detected, decoding said frame and supplying said decoded frame to the output.

Further features and advantages of the invention, as well as the structure and operation of particular embodiments of the invention, are described in detail below with reference to the accompanying drawings.

III. BRIEF DESCRIPTION OF THE DRAWINGS

The present invention is described with reference to the accompanying drawings. In the drawings, like reference numbers indicate identical or functionally similar elements, and FIG. 1 is a block diagram of a G.726 ADPCM encoder;

IV. DESCRIPTION OF THE PREFERRED EMBODIMENTS

1. Example Environment

The present invention is suitable for use in communication systems operating in accordance with the telecommunications standards of various countries. In order to provide a specific implementation example, operation of the present invention in accordance with the Digital European Cordless Telecommunications (DECT) standard will now be described. DECT is the mandatory European standard for all digital cordless telecommunication systems, including both business and residential applications, applications involving PCS services, and applications such as Radio in the Local Loop (RLL) involving radio as the final link or loop between the local telephone network and subscribers. The use of the present invention in conjunction with a DECT format is only one specific embodiment of the present invention. It should be appreciated that the invention is equally suitable for implementation in conjunction with the standards of other countries such as, for example, the PHS standard of Japan.

Figure 1:
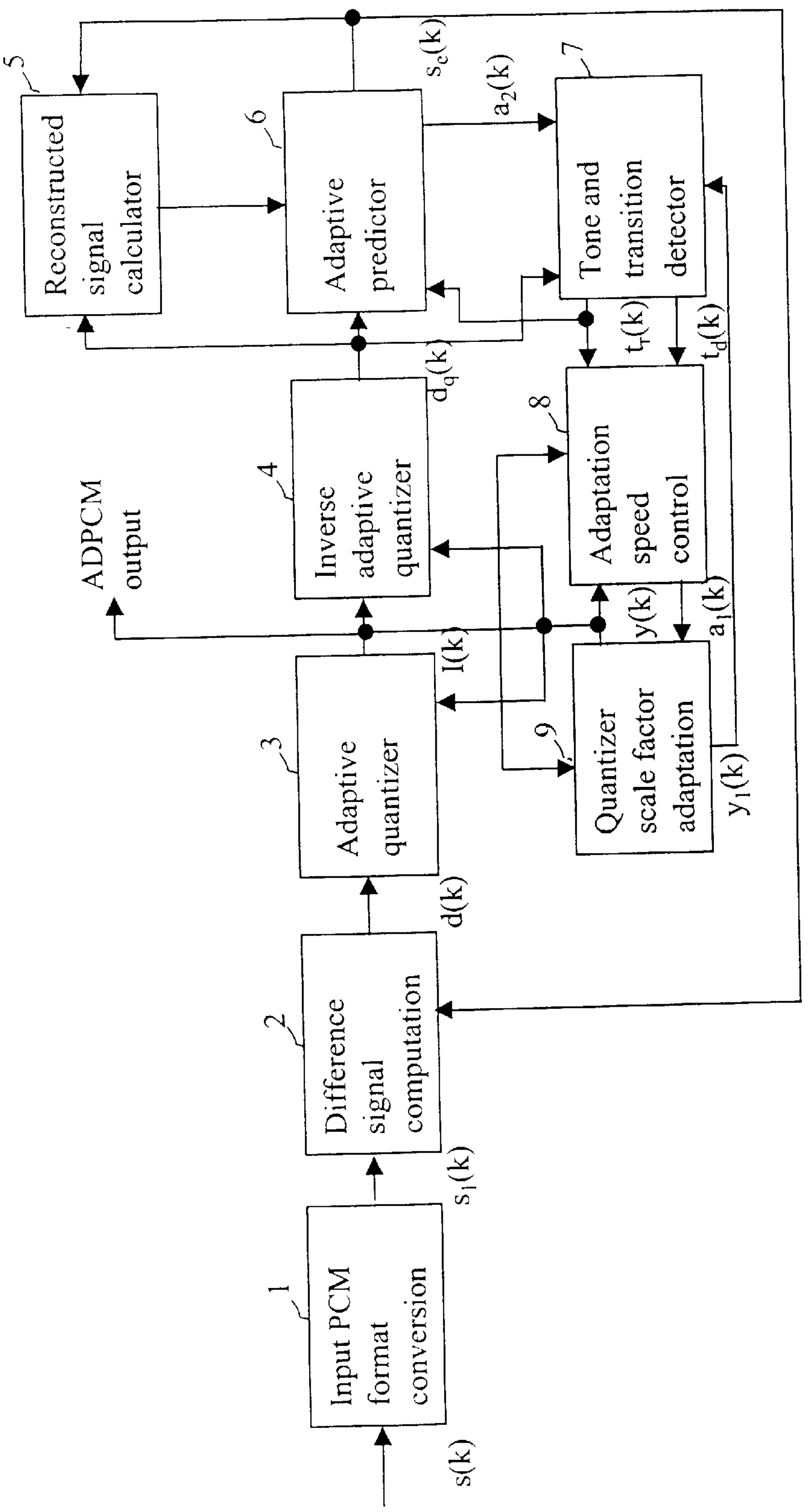
Figure 2:
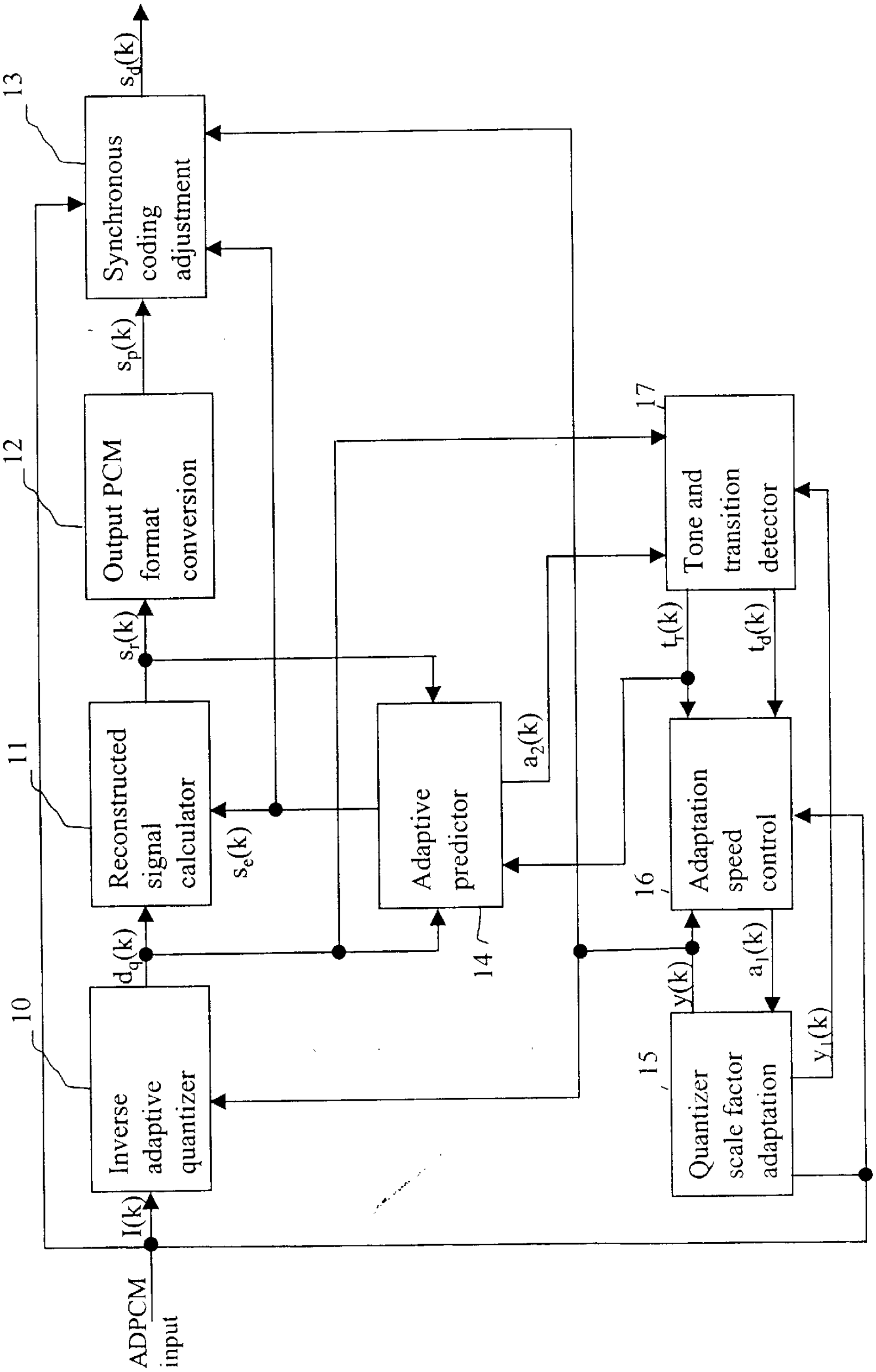
FIG. 2 is a block diagram of a G.726 ADPCM decoder.
Figure 3:
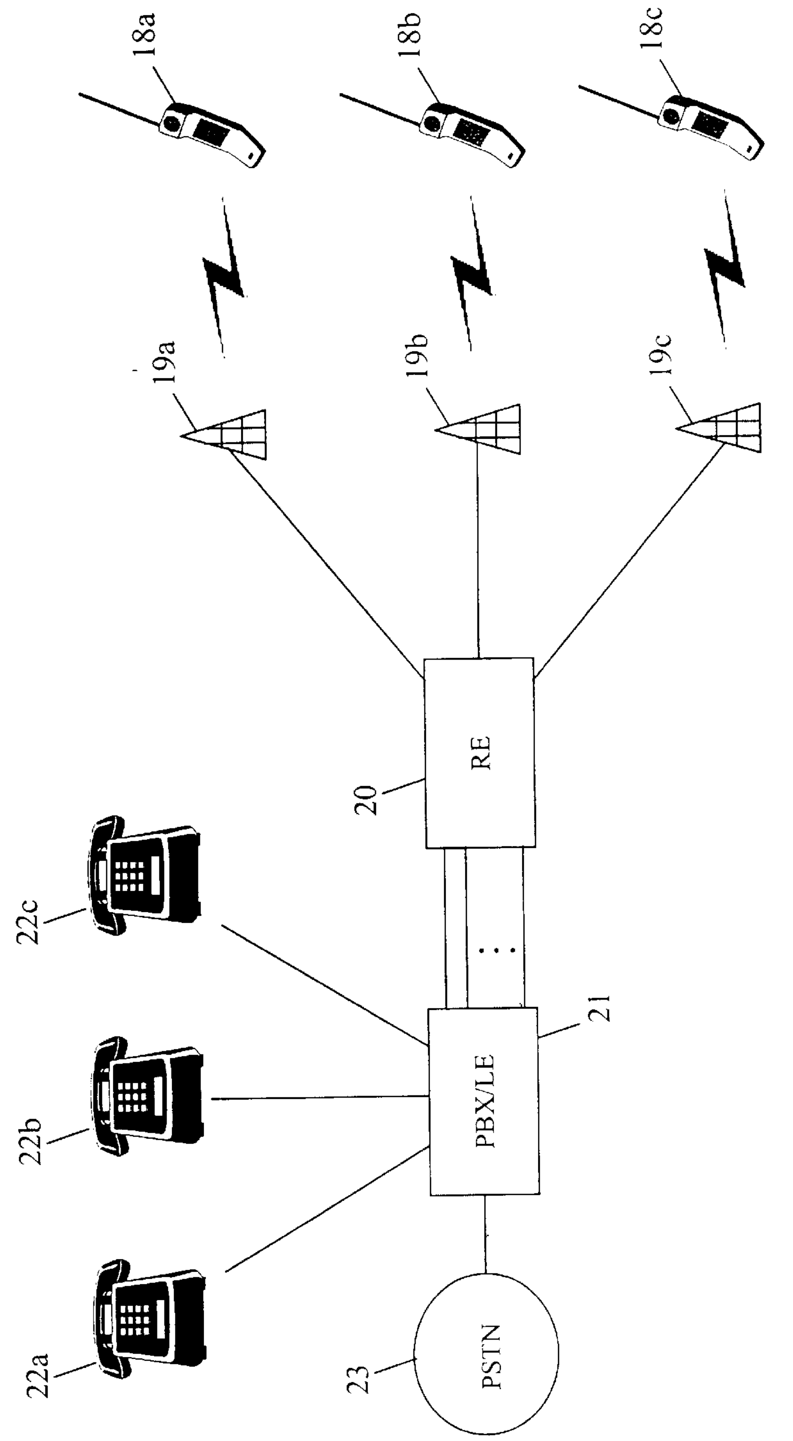
FIG. 3 is a diagram of a DECT compliant communications system.

FIG. 3 illustrates a typical DECT system. As illustrated, the system comprises a radio exchange (RE) 20 connected directly to a plurality of radio base stations 19*a*, 19*b*, 19*c*, which in turn are connected through a wireless interface to corresponding ones of mobile cordless or wireless handsets 18*a*, 18*b*, 18*c*. Each of the base stations 19*a*, 19*b*, 19*c* is assigned to a distinct geographical area or cell, and handles calls to/from handsets within the cell assigned to that base station. For indoor cells, the radius of a cell typically ranges from 10–100 m. For outdoor cells, the radius of a cell typically ranges from 200–400 m.

As illustrated, the radio exchange 20 is typically coupled to a wired exchange 21. In outdoor applications such as RLL, the wired exchange 21 is a local exchange (LE), whereas, in business environments, the wired exchange 21 is a private branch exchange (PBX). The PBX/LE in turn is connected to Public Switched Telephone Network (PSTN) 23, that is, the ordinary public telephone network.

Each of the mobile handsets 18*a*, 18*b*, 18*c* and each of the base stations 19*a*, 19*b*, 19*c* comprise a wireless interface comprising in each such unit a transceiver unit having a transmitter/modulator part, and a receiver/demodulator part, both connected to a receive/transmit antenna. Further included in each unit is a transmission control and synchronization unit for establishing correct radio link transmissions. A speech processor is also provided in each such unit for processing transmitted or received speech. The speech processing unit is connected to at least one speech encoder and decoder (codec), a unit responsible for encoding and decoding speech. In the mobile unit 18*a*, 18*b*, 18*c*, a codec is connected to a user interface comprising a microphone and loudspeaker. In accordance with the DECT standard, the encoder part of the codec is a ADPCM encoder, and the decoder part of the codec is a ADPCM decoder. A PCM codec may also be included. A central processing unit is provided in each such unit for controlling the overall operation of the base station or mobile.

Figure 4:
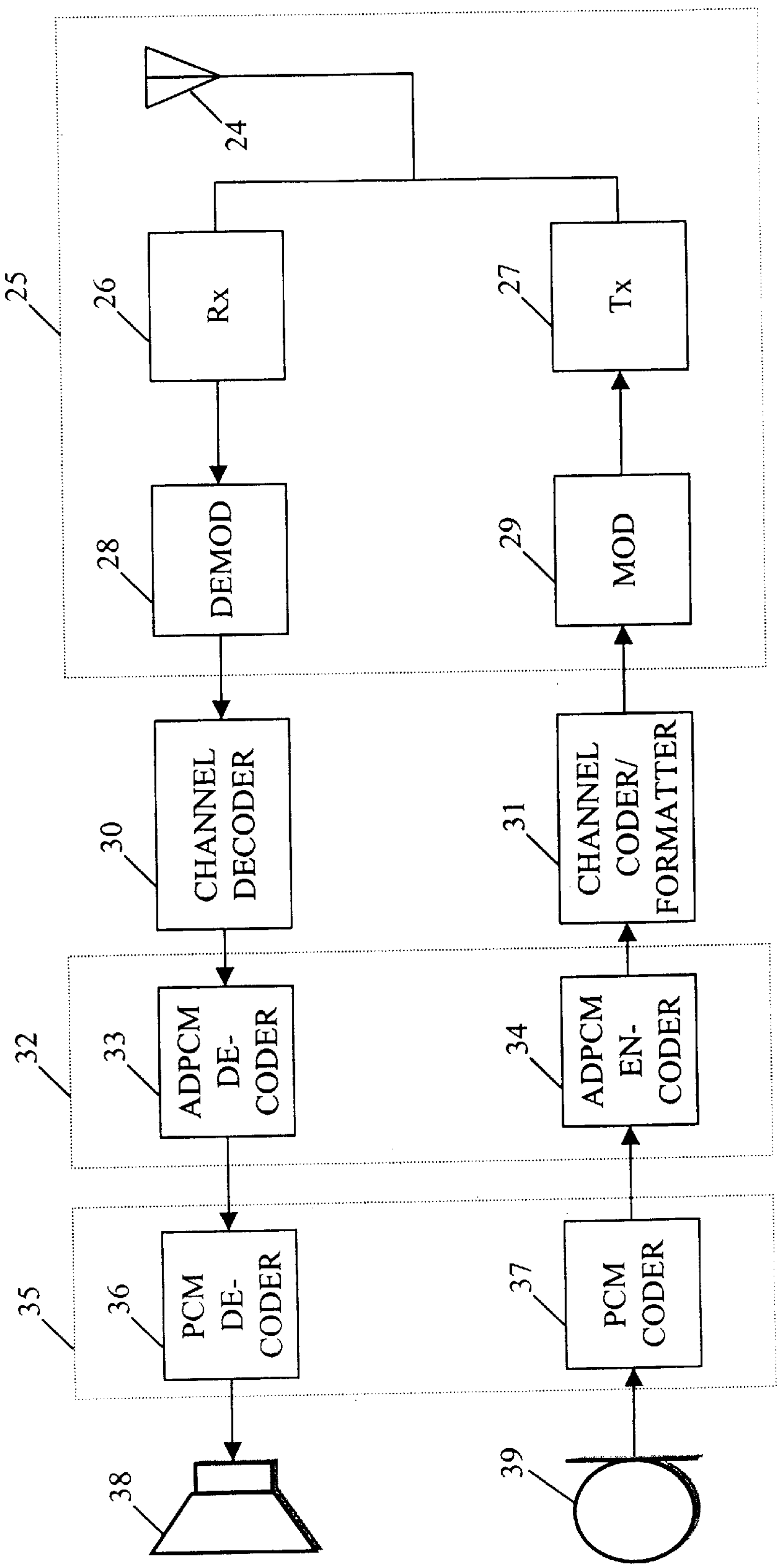
FIG. 4 is a block diagram of a communications device configured for use in the system of FIG. 3.

A block diagram of a mobile handset 18*a*, 18*b*, 18*c* is illustrated in FIG. 4. As illustrated, the unit comprises microphone 39, PCM coder 37, ADPCM encoder 34, channel coder/formatter 31, modulator 29, transmitter 27, antenna 24, receiver 26, demodulator 28, channel decoder 30, ADPCM decoder 33, PCM decoder 36, and speaker 38. Together, PCM decoder 36 and PCM coder 37 are part of speech processor 35. In addition, ADPCM encoder 34 and ADPCM decoder 33 are part of ADPCM codec 32. Further, demodulator 28, receiver 26, antenna 24, transmitter 27, and modulator 29 comprise wireless interface 25. These components are coupled together as shown. It should be appreciated that the same or similar components are present in the base station 19*a*, 19*b*, 19*c*.

The components of the handset can be logically grouped into a transmit link or path, and a receive link or path. In one embodiment, the receive path comprises antenna 24, receiver 26, demodulator 28, channel decoder 30, ADPCM decoder 33, PCM decoder 36, and speaker 38; and the transmit path comprises microphone 39, PCM coder 37, ADPCM encoder 34, channel coder/formatter 31, modulator 29, transmitter 27, and antenna 24.

In the transmit path, the PCM coder 37 converts an analog speech signal as received from microphone 39 into PCM samples, that is, it performs A/D conversion on the analog speech signal. In one embodiment, the PCM samples are uniform PCM samples. In one example of this embodiment, the PCM samples are uniform 14-bit samples in the range of −8192 to +8191. In another embodiment, the PCM samples are compressed A-law or $\mu$-law PCM samples. In one example of this embodiment, the PCM samples are compressed A-law or $\mu$-law 8-bit samples. ADPCM encoder 34 encodes the PCM samples into ADPCM-encoded speech samples in accordance with the G.726 standard. Channel coder/formatter 31 formats the encoded ADPCM samples into frames, and in addition, optionally appends thereto an error detecting/correcting code such as a cyclic redundancy check (CRC) code. Modulator 29 modulates the incoming speech frames according to a suitable modulation scheme such as QPSK. Transmitter 27 transmits the modulated speech frames through antenna 24.

In the receive path, encoded speech frames are received by receiver 26 over antenna 24. The received speech frames are demodulated by demodulator 28, and then processed by channel decoder 30. In one embodiment, the channel decoder calculates a CRC code from the speech samples for a frame, and compares it with the CRC appended to the frame to perform error detection and/or correction. The speech samples are then passed through ADPCM decoder 33 to obtain PCM speech samples. Preferably, the PCM speech samples are uniform PCM samples. In one embodiment, the PCM samples are uniform 14-bit samples in the range −8192 to +8191. The PCM samples are then decoded by PCM decoder 36, that is, they are converted to an analog speech signal. The analog speech signal is then provided to speaker 38 whereupon it is audibly played.

In one implementation example, the functions performed by the PCM decoder 36, the ADPCM decoder 33, the channel decoder 30, the PCM coder 37, the ADPCM encoder 34, and the channel coder/formatter 31 are implemented in software executed by a computer, that is, a device configured to execute a discrete series of instructions stored in a computer-readable media. The computer may be a digital signal processor (DSP), a baseband processor, a microprocessor, a microcontroller, or the like. This software is typically stored on a computer readable media, such as read only memory (ROM), non-volatile read access memory (NVRAM), electronically erasable programmable read only memory (EEPROM), or the like.

The DECT uses a Multi-Carrier (MC)/Time Division Multiple Access (TDMA)/Time Division Duplex (TDD) format for radio communication between remote units such as handset 18*a*, 18*b*, 18*c* and base station 19*a*, 19*b*, 19*c* in FIG. 3. Under DECT, ten radio frequency carriers are available. Each carrier is divided in the time domain into twenty-four time slots, with each slot duration being 416.7 $\mu$s. Two time-slots are used to create a duplex speech channel, effectively resulting in twelve available speech channels at any of the ten radio carriers. The twenty-four time slots are transmitted in so-called TDMA frames having a frame duration $T_F$ of 10 ms.

Figure 5:
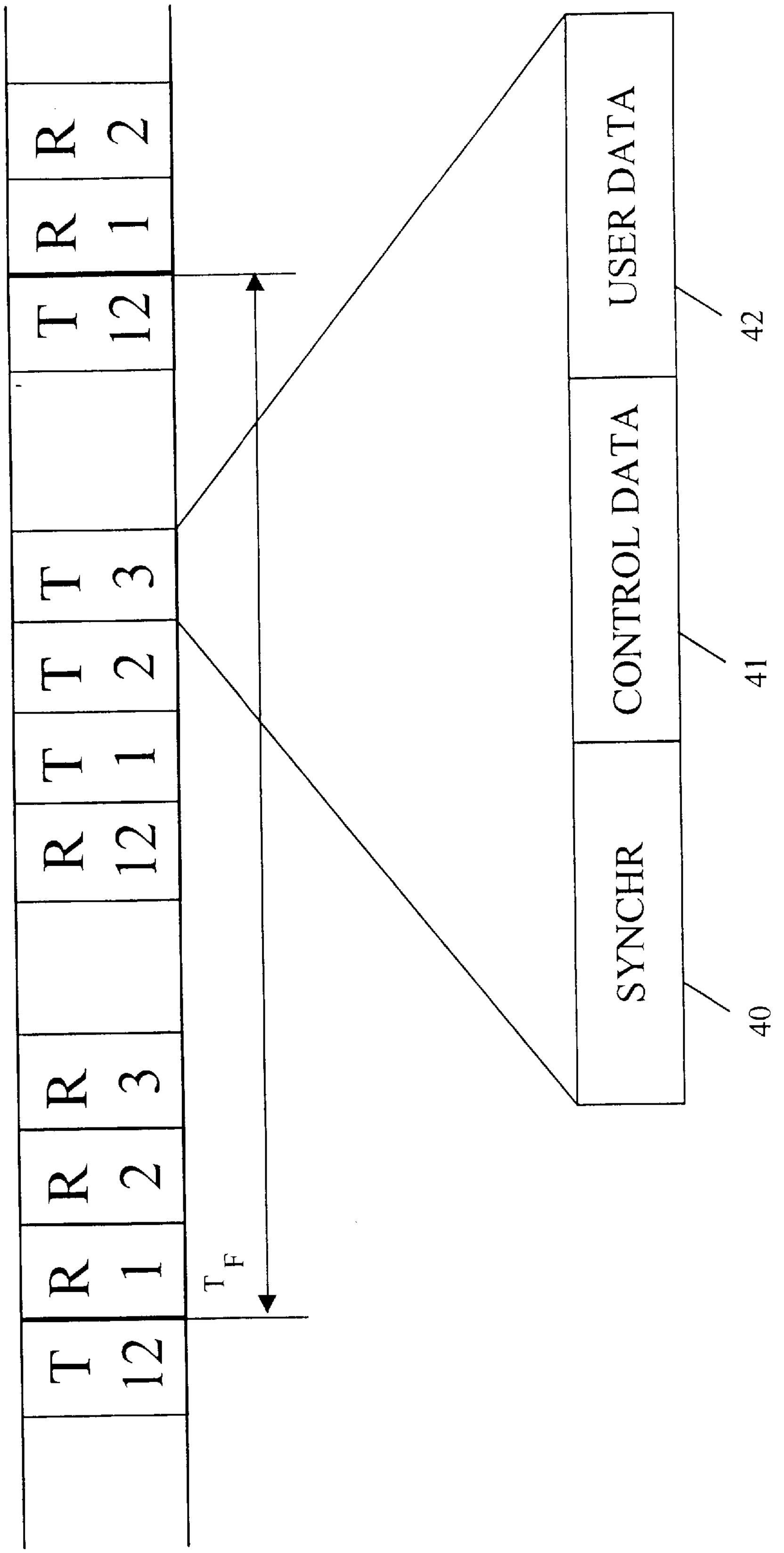
FIGS. 5 and 6 illustrate the TDMA frame and slot structure is a DECT-compliant communications system.

A typical TDMA frame structure is illustrated in FIG. 5. During the first half of the frame, that is, during the first twelve time slots designated R1, R2, . . . R12, data from any of base stations 19*a*, 19*b*, 19*c* is received by a corresponding one of handset 18*a*, 18*b*, 18*c*, whereas in the second half of each frame, that is, the second twelve time slots designated T1, T2, . . . T12, the corresponding handset 18*a*, 18*b*, 18*c* transmits data to the appropriate base station 19*a*, 19*b*, 19*c*. A radio connection between any of handsets 18*a*, 18*b*, 18*c* and a corresponding one of base station 19*a*, 19*b*, 19*c* is assigned a slot in the first half of the frame and a slot bearing the same number in the second half of the frame. As illustrated, each time slot typically contains synchronization data 40, control data 41, and information or user data 42.

Figure 6:
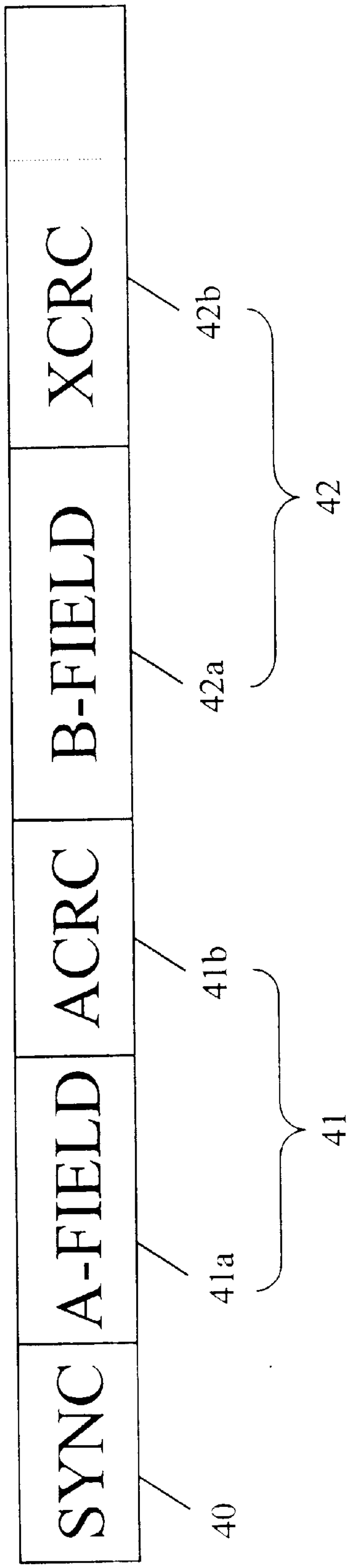

A more detailed frame structure is shown in FIG. 6. The synchronization data field 40 contains a synchronization (SYNC) word which must be correctly identified at the receiver in order to process the received data. The synchronization data also serves the purpose of data clock synchronization. SYNC data will typically occupy 32 bits. The control data 41 includes A-FIELD 41*a*, which contains system information such as identity and access rights, services availability, information for handover to another channel or base station, and paging and call set-up procedures. Also included in the control data is a 16 bit Cyclic Redundancy Check (CRC) word designated ACRC 41*b*. The control data 41 typically occupies 64 bits.

The information or user data 42 comprises B-FIELD 42*a* and XCRC 42*b*. In the case of a telephone call, B-FIELD 42*a* comprises digitized speech samples obtained during the slot duration time. These samples are digitally-coded in accordance with the G.726 standard at a typical bit rate of 32 kb/s. This means that B-FIELD 42*a* typically comprises 320 bits, or 80 speech samples of 4 bits each. These samples are ADPCM-encoded data formed from successive 8 bit wide PCM coded speech samples. The B-FIELD data is scrambled and a 4 bit CRC word designated XCRC 42*b* is formed from the scrambled data. With 32 bits for the SYNC field, 64 bits for control data, 320 bits for the B-FIELD, and 4 bits for the XCRC, a total of 420 bits/slot is required. Including guard space, the total number of bits per slot according to the DECT standard amounts to 480.

The channel bit rate for transmission of the multiplexed data over a channel is 1.152 Mbps.

2. The Subject Invention

In one implementation example, the subject invention may be beneficially employed in the foregoing environment in either a mobile handset 18*a*, 18*b*, 18*c* or a base station 19*a*, 19*b*, 19*c* to reduce audible click noise introduced through transmission over the wireless channel. It should be appreciated, however, that the invention may also be beneficially employed in any PCS device or infrastructure component which interfaces with another PCS device or infrastructure component through a dispersive channel.

Figure 7:
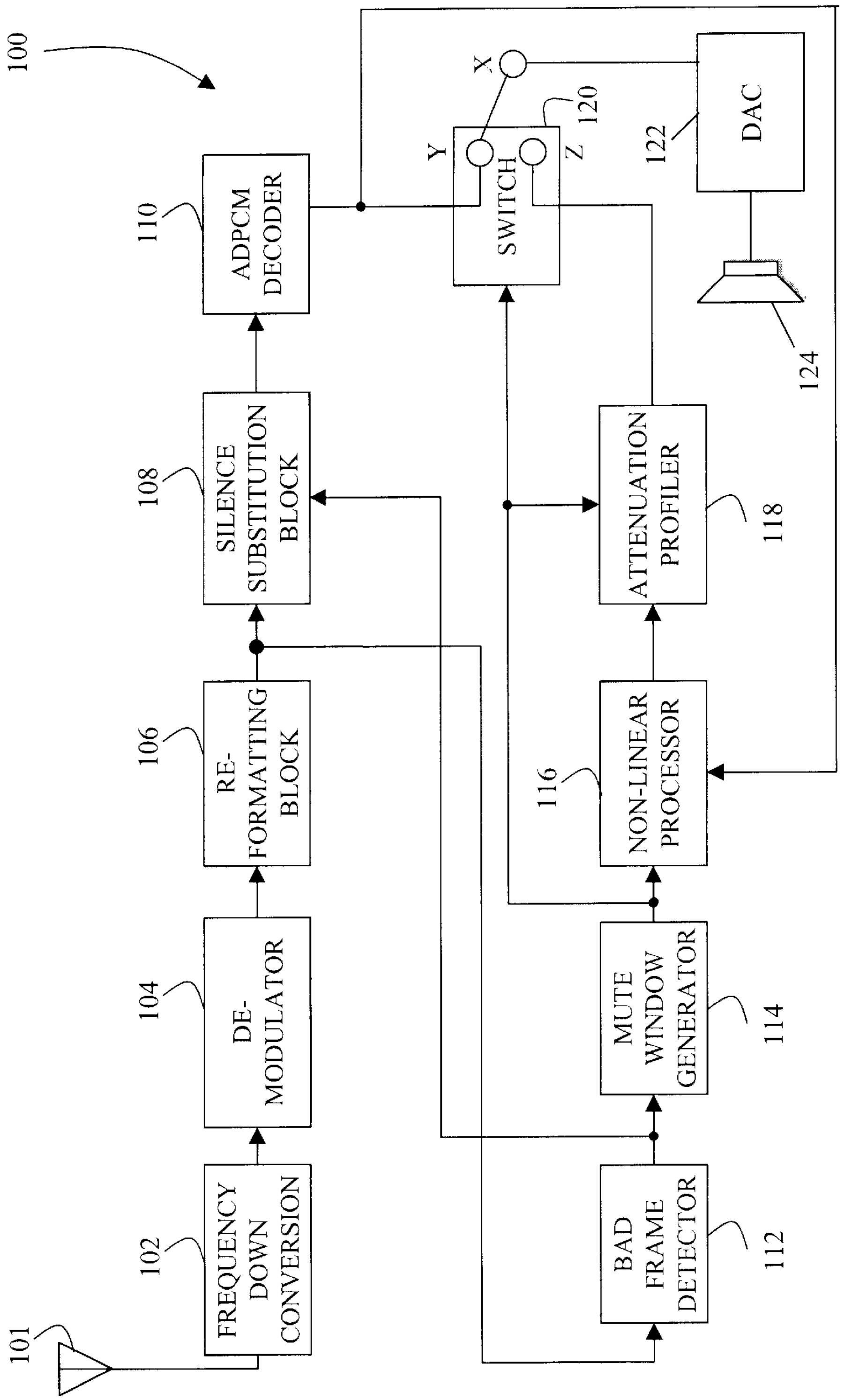
FIG. 7 is an illustration of a receive path configured in accordance with the subject invention.

A block diagram of a receive path 100 in a handset configured in accordance with the subject invention is illustrated in FIG. 7. As illustrated, the receive path 100 comprises antenna 101, frequency down-conversion device 102, demodulator 104, reformatting unit 106, silence substitution unit 108, ADPCM decoder 110, bad frame detector 112, mute window generator 114, non-linear processor 116, programmable attenuation profiler 118, switch 120, digital-to-analog converter (DAC) 122 and loudspeaker 124.

Antenna 101 receives an ADPCM-coded digital RF signal, which may be amplitude modulated (AM), frequency modulated (FM), phase modulated or modulated under any of the multilevel-modulation schemes. A multiplexing access scheme may be any suitable scheme such as frequency division (FDMA), time division (TDMA) or code division (CDMA). A duplex scheme may be any suitable scheme such as frequency division duplex or time division duplex (TDD). In one implementation example configured for use in the foregoing DECT environment, the modulation scheme is $\pi/4$ QPSK, the multiplexing access scheme is TDMA, and the duplex scheme is TDD.

The signal initially passes through frequency down-conversion device 102. Device 102, operating under known methods of frequency down-conversion, reduces the frequency of the received RF signal to a frequency appropriate for processing voice frames. Device 102 may be a typical single heterodyne or double heterodyne configuration, or it may be a direct conversion configuration. Each of these configurations is well known to those of ordinary skill in the art.

Demodulator 104 demodulates the baseband signal received from device 102, according to the modulation scheme that was used for transmission, in order to produce a demodulated ADPCM signal, in the form of a binary bit stream, containing voice and error detection information within a series of voice frames. The error detection information provides a means to identify bad or erroneous frames. In one embodiment, this error detection information is in the form of a cyclic redundancy check (CRC) code word. The format of the ADPCM-coded frames may vary depending on the particular telecommunications standard employed. In one embodiment configured for use in the foregoing environment, the ADPCM-coded frames are formatted under the Digital European Cordless Telecommunications (DECT) standard. In one implementation example, each frame includes 80 4-bit ADPCM-encoded speech samples and a 4-bit CRC word for each communications link, whether base-to-mobile or mobile-to-base.

Reformatting unit 106 groups the detected binary bit stream for a frame into ADPCM-encoded speech samples and error detection information. It provides the ADPCM-encoded speech samples to silence substitution block 108, and the error detection information to bad frame detector 112.

Bad frame detector 112 analyzes the error detection information to determine if there is an error in the frame. In one implementation example configured for use in the foregoing DECT environment, the error detection information is a CRC code word, and the bad frame detector 112 compares the CRC code word received for a voice frame to a CRC code word calculated locally from the speech portion of the frame, that is, the ADPCM-encoded speech samples. In this implementation example, if the locally-calculated code word matches the received code word, the received voice frame is assumed to be "good" or free from error, and if the locally-calculated CRC code word does not equal the received CRC code word, the frame is assumed to be "bad" or contain errors.

If a good frame is detected, detector 112 sends an appropriate signal to mute window generator 114, which determines if a mute window is open, and if so, decrements the width or duration of the mute window by one unit. The operation of mute window generator 114 and the function of mute windows will be described in more detail herein. If a bad frame is detected, detector 112 sends an appropriate signal to mute window generator 114, which opens a mute window by setting the width thereof to its nominal maximum value. In addition, when a bad frame is detected, detector 112 activates silence substitution block 108 to mute the frame, that is, substitute ADPCM-encoded silence for the voice portion of the frame. In one implementation example, silence substitution block 108 replaces the voice portion of a frame with an all '1' bit stream which is ADPCM-encoded silence per the G.726 standard. (At the ADPCM decoder 110, this all '1' bit stream is decoded into an all zero PCM output signal.)

ADPCM decoder 110 is configured to decode the ADPCM-encoded speech samples to provide PCM-encoded speech samples. In one embodiment, the ADPCM decoder is a G.726 compliant decoder of the type described previously in the background section. In one implementation example, the ADPCM-encoded speech samples are 4-bit samples provided at a rate of 32 kb/s, and the PCM-encoded speech samples are 8-bit uniform PCM-encoded samples provided at 64 kb/s.

Mute window generator 114 activates or opens or reopens a "mute window" upon detection of a bad voice frame. Essentially, the mute window is a period after the initial receipt of a bad frame during which the decoded ADPCM voice frames undergo continued post-processing before conversion to an analog audio signal. Notably, this post-processing occurs even if the subsequently received ADPCM frames are good and is a reflection of the "adaptive" nature of the ADPCM decoder. More specifically, upon receipt of an erroneous frame, decoder 110 "adapts" or recalculates its scaling factor accordingly. From this point, a number of frames must pass through decoder 110 before the effects of the initial error fully "propagate" through the system, and decoder 110 returns to a normal state. During this time, the scaling factor, even with respect to good frames, may be erroneous, leading to a distorted voice signal. The post-processing during the period that the mute window is open is intended to minimize the effects of any such distortion.

As noted above, when bad frame detector 112 signals a bad frame, mute window generator 114 opens or reopens a mute window to its maximum width or duration. The mute window width or duration is defined in terms of a number of voice frames N. In one preferred embodiment of this invention, the maximum duration of the mute window is 2N. The value of N is related to frame duration and the average time λ it takes for the ADPCM decoder 110 to converge after the occurrence of an error, that is, the average time is takes the scale factor y(k) determined at the decoder to converge to the corresponding value at the encoder. Preferably, the following relationship should hold:

$$N \geq \frac{\lambda}{2D_f},$$

where $D_f$ is the frame duration.

In one embodiment, generator 114 includes an internal counter that represents the current duration or width of the mute window. Hence, when a bad frame is received, the counter is set or reset to the maximum duration, that is, 2N. Thereafter, for each consecutively received good frame, the counter is decremented by one until it has reached a value of zero. When the counter has stored a value of zero, the mute window is closed.

Figure 10:
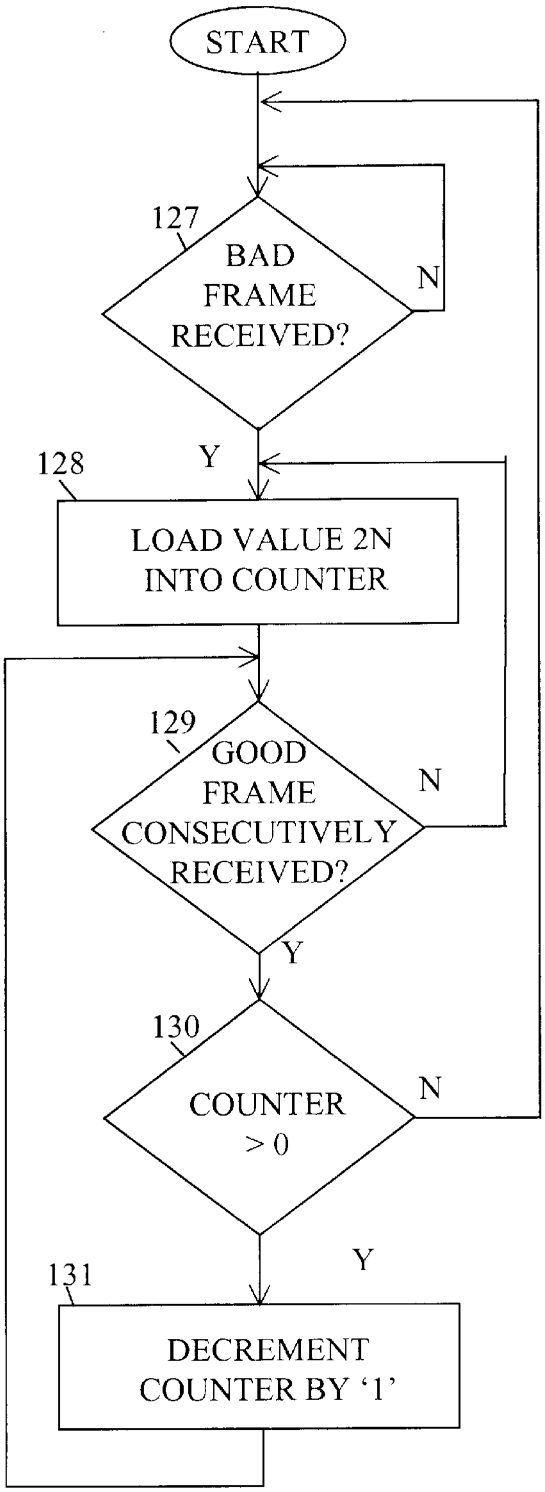
FIG. 10 illustrates a method of operation of one embodiment of a mute window generator in accordance with the subject invention.

The operation of this embodiment of generator 114 is illustrated in FIG. 10. Upon the receipt of a frame, step 127 is performed. In step 127, an inquiry is made to determine if a bad frame has been received. If not, a loop back to the beginning of step 127 is performed. If so, step 128 is performed. In step 128, the value 2N is loaded into the counter. Next, in step 129, an inquiry is made whether a good frame has been consecutively received. If not, a jump is made back to the beginning of step 127. If so, step 130 is performed. In step 130, an inquiry is made to determine whether the contents of the counter are greater than 0. If not, indicating that the counter has expired, a jump is made back to the beginning of step 127. If so, in step 131, the counter is decremented by one, and a jump is made to the beginning of step 129.

As indicated in FIG. 7, mute window generator 114 generates and supplies a control signal to switch 120 that controls its operation. Preferably, the control signal is determined responsive to the status of the mute window: if the mute window is open, the control signal is in an activated state, and if the mute window is closed, the control signal is in a deactivated state. In one embodiment, the value stored in the internal counter of the mute window generator 114 determines the status of this control signal. When the contents of the counter is greater than zero, indicating that the mute window is open, the control signal is in an activated state, and when the contents of the counter are at zero, indicating that the mute window is closed, the control signal is in a deactivated state.

Responsive to this control signal, switch 120 is either placed in position 'YX' or 'ZX'. If the control signal is in an activated state, switch 120 is signaled to move to position 'XZ', thereby connecting DAC 122 with the output of attenuation profiler 118. If the control signal is in a deactivated state, switch 120 is signaled to move to position 'YX', thereby bypassing non-linear processor 116 and attenuation profiler 118, and connecting DAC 122 directly to the output of ADPCM decoder 110. Consequently, if the control signal is in a deactivated state, no post-processing is performed on the output of ADPCM decoder 110, or if it is, it is ignored, while if it is in an activated state, post-processing is performed on the output of ADPCM decoder 110.

Post-processing according to the subject invention is performed by non-linear processor 116 and attenuation profiler 118. In one embodiment, these two units are optionally activated or not responsive to the control signal output from mute window generator 114. If the control signal is in an activated state, these two units are activated to perform post-processing on the output of the ADPCM decoder 110, while if the control signal is in a deactivated state, these two units are deactivated from performing post-processing on the output of the ADPCM decoder 110. In an alternate embodiment, these two units are always activated to perform post-processing on the decoded frames, with the post-processed frames being ignored when the control signal is deactivated. In both embodiments, the important point is that post-processed decoded frames are substituted for decoded frames not subject to the post-processing while the mute window is open.

In one embodiment, non-linear processor 116 is a compander which has the following characteristics equation:

$$y=x, \text{ if } |x| \leq \beta; \text{ and}$$

$$y=\text{sign}(x)*(a+b|x|+cx^2), \text{ otherwise;}$$

where x is the input signal to non-linear processor 116, y is the output signal from processor 116, $0<\beta_{min}<\beta<\beta_{max}$, and coefficients a, b and c are non-zero real numbers that are predefined for different levels of desired non-linear muting effect.

Figure 8:
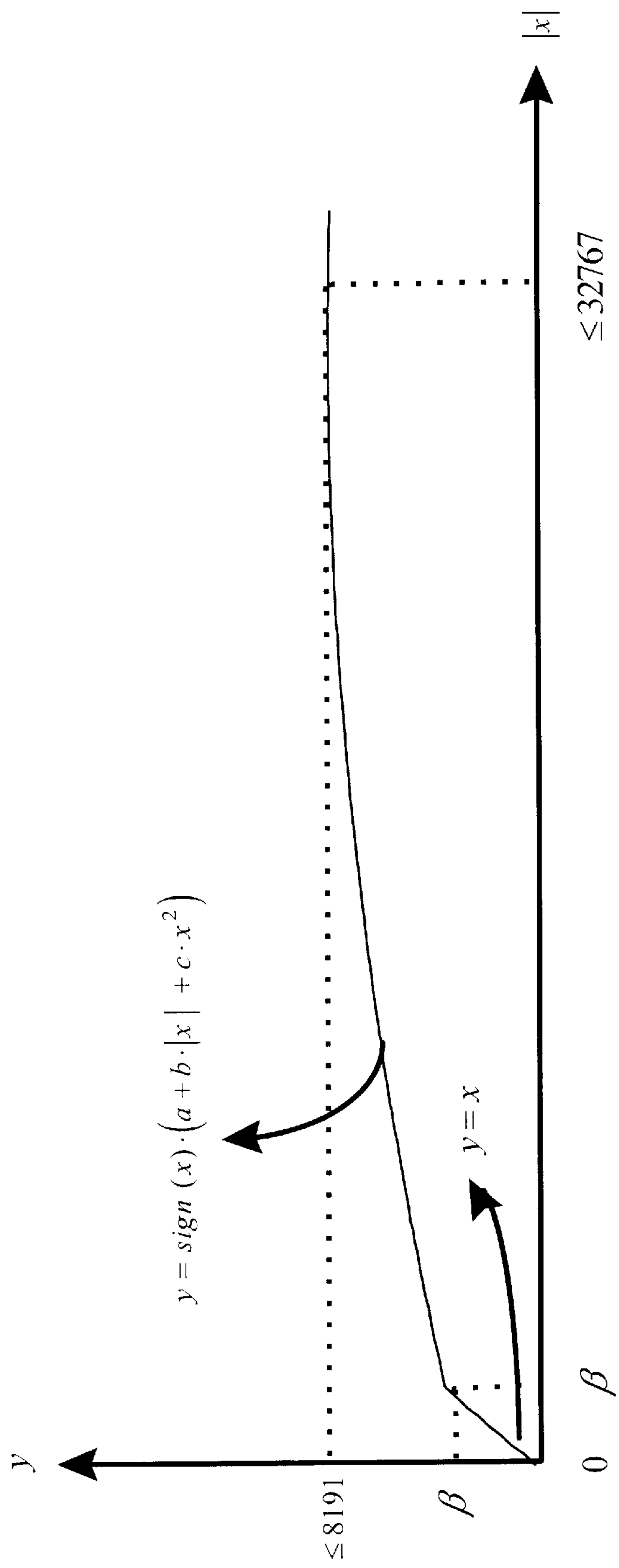
FIG. 8 illustrates the characteristics of the non-linear processor in one implementation of the subject invention.

In one embodiment, the relationship between the input to, and output from, processor 116 is graphically illustrated in FIG. 8. As can be seen, for small values of the input x, to a limit of β, the output y is equal to the input x (a linear relationship). As x increases beyond β, the relationship becomes nonlinear, with the output y increasing at a much slower rate relative to the input x.

As mentioned previously, when a bad frame passes through decoder 110, it adapts or recalculates its scaling factor. A number of frames must then pass through decoder 110 before the effects of the initial error fully "propagate" through the system, and decoder 110 returns to a normal state. During this time, the scaling factor may be inaccurate and cause distortions in the output voice signal. One such distortion may be inappropriately high output levels. The post-processing performed by non-linear processor 116 effectively reduces output levels when they exceed a value β. The effect is to eliminate distortion in the form of inappropriately high output levels.

Further post-processing is performed on the voice frames by programmable attenuation profiler 118. Preferably, the degree or level of attenuation performed by the programmable attenuation profiler 118 is determined based on the degree to which the mute window is open or closed. In one embodiment, when the window is open to its maximum extent, the level of attenuation is less than 1.0, that is, the signal is actually boosted. In this embodiment, as the window closes, the degree of attenuation increases such that, when the window is about halfway closed, the degree of attenuation is greater than 1.0. As the window continues to close, in this embodiment, the level of attenuation decreases such that when the window is fully closed, the level of attenuation is at 1.0, that is, the signal is allowed to pass through unaffected, being neither boosted or attenuated.

Figure 9:
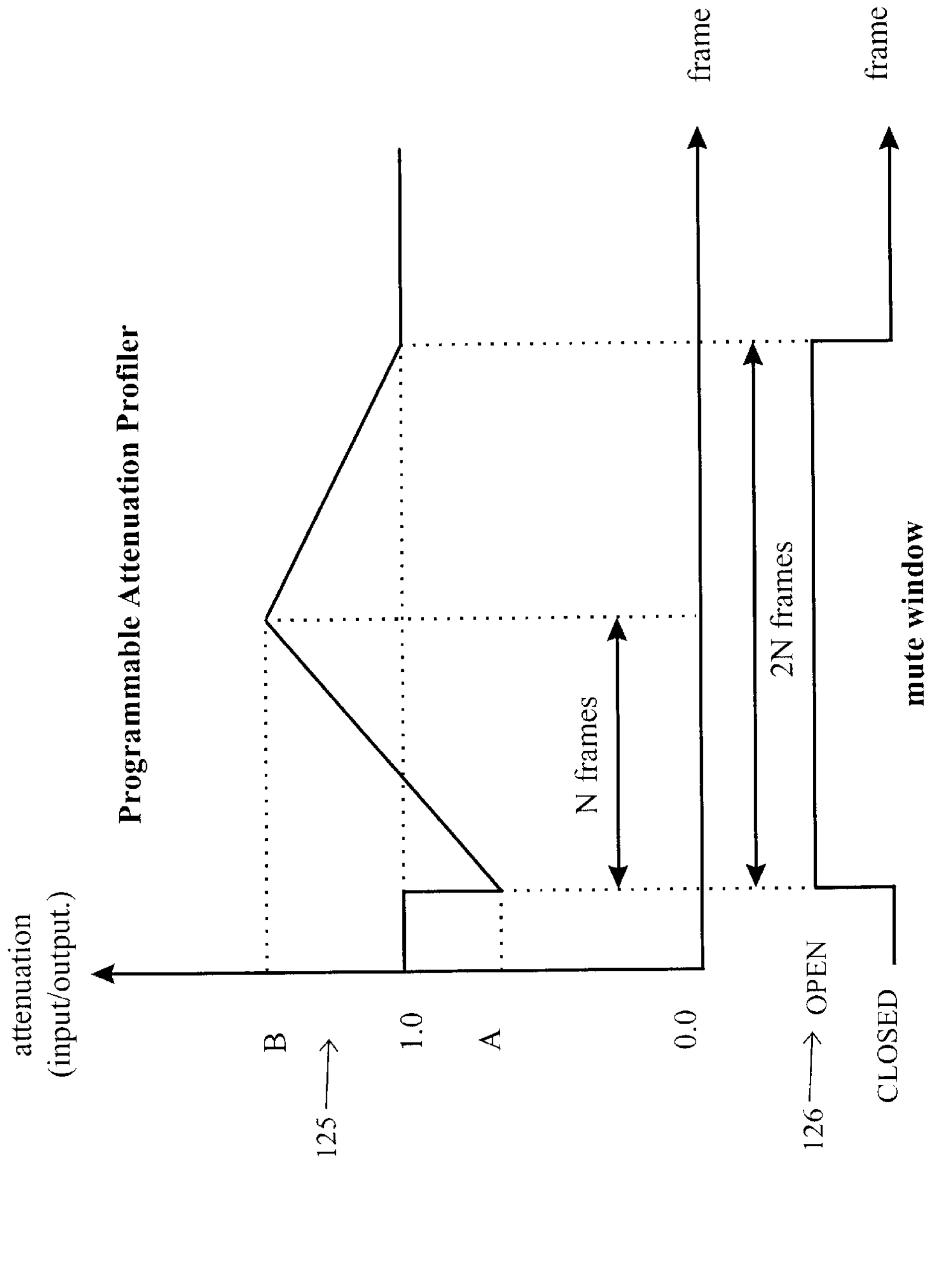
FIG. 9 illustrates the characteristics of the programmable attenuation profiler in one implementation of the subject invention.

In one embodiment, the level or degree of attenuation is determined responsive to the contents of the counter maintained in one implementation of mute window generator 114. FIG. 9 graphically depicts the operation of this embodiment of profiler 118. The profile illustrated is exemplary of the receipt of one bad frame, followed by at least 2N good frames. In FIG. 9, numeral 125 identifies a plot of the level of attenuation as a function of the number of good frames which are consecutively received after receipt of an initial bad frame, and numeral 126 identifies the time period over which the corresponding mute window is kept open. The attenuation level is unity until bad frame detector 112 depicts a bad frame. At this point, mute window generator 116 sets its counter to a value of 2N, and, responsive thereto, profiler 118 sets the level of attenuation to A, which is between zero and one. The level of attenuation is incremented by a value δ for each of the next N frames, at which point the counter has stored a value of N, and the level of attenuation is B. (As discussed previously, the counter is decremented by a value of one upon receipt of a good frame). At this point, as good frames continue to be received, the attenuation level decrements by a value γ with each passing frame, such that, when the contents of the counter are zero, and the mute window is closed, the attenuation level is unity. In this embodiment, the parameters A, B, N, δ, and γ bear the following relationships: $B=A+N\delta$ and $B-N\gamma=1$.

Figure 11:
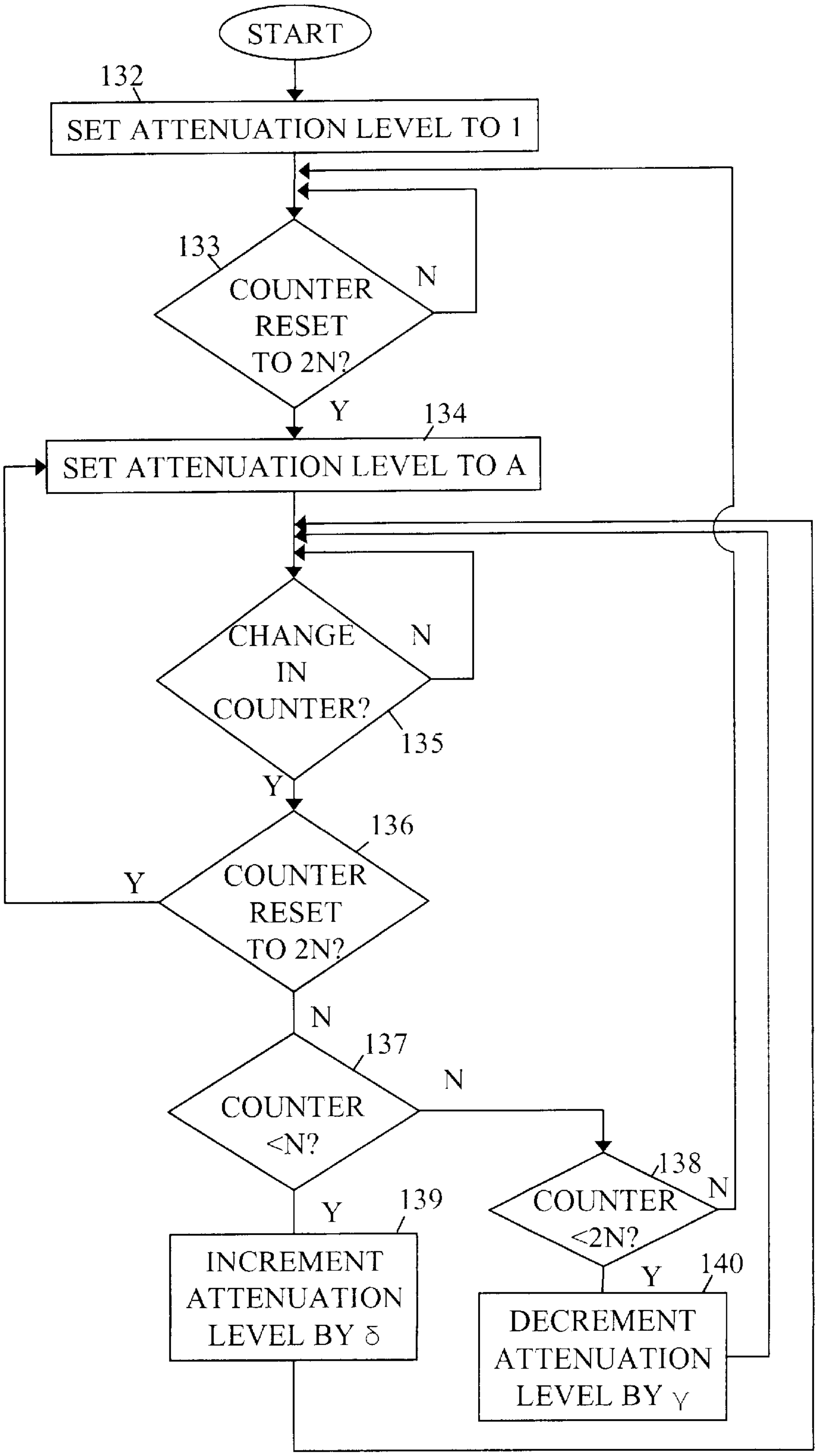
FIG. 11 illustrates a method of operation of one embodiment of a programmable attenuation profiler in accordance with the subject invention.

The operation of this embodiment of profiler 118 is illustrated in FIG. 11. Upon the start of this process, step 132 is performed, in which the attenuation level is set to 1. Step 133 is then performed. In step 133, an inquiry is made whether the counter maintained by one embodiment of mute window generator 114 has been reset to a value of 2N, indicating that a bad frame has been detected. If not, a loop back is made to the beginning of step 133. If so, step 134 is performed. In step 134, the level of attenuation is set to A. Next, step 135 is performed. In step 135, an inquiry is made whether there has been a change in the contents of the counter. If not, a loop back is made to the beginning of step 135. If so, in step 136, an inquiry is made whether the change was a resetting of the counter to 2N, indicating that another bad frame was received. If so, a jump is made to step 134, in which the attenuation level is set or reset to A. If not, indicating that the change in the counter must have been through decrementing of the counter by 1, indicating the consecutive receipt of a good frame, a jump is made to step 137. In step 137, an inquiry is made whether the contents of the counter is less than N. If so, step 139 is performed. If not, a jump is made to step 138. In step 139, the level of attenuation is incremented by δ. In step 138, an inquiry is made whether the contents of the counter is less than 2N. If so, step 140 is performed. If not, indicating that the counter has expired, a jump is made to the beginning of step 133. In step 140, the attenuation level is decremented by γ. Upon the completion of steps 139 and 140, a jump is made to the beginning of step 135.

Preferably, the values of A and B are such that the following relationships hold: $0<A<1.0$; and $B\geqq 1.0$. The values of δ and γ may be programmable or non-programmable, and may also be adaptive or static.

The signal processing performed by profiler 118 enhances the non-linear muting effects of non-linear processor 116 by applying gradual decremental or incremental attenuation per frame on the companded signal for the duration of the mute window. The effect is analogous to an operation in which, upon the occurrence of an unpleasant "click" or "pop", the volume of the loudspeaker is turned down gradually and then turned back up when the problem has ceased.

If desired, the functions of non-linear processor 116 and attenuation profiler 118 may be incorporated into a single component.

Figure 12:
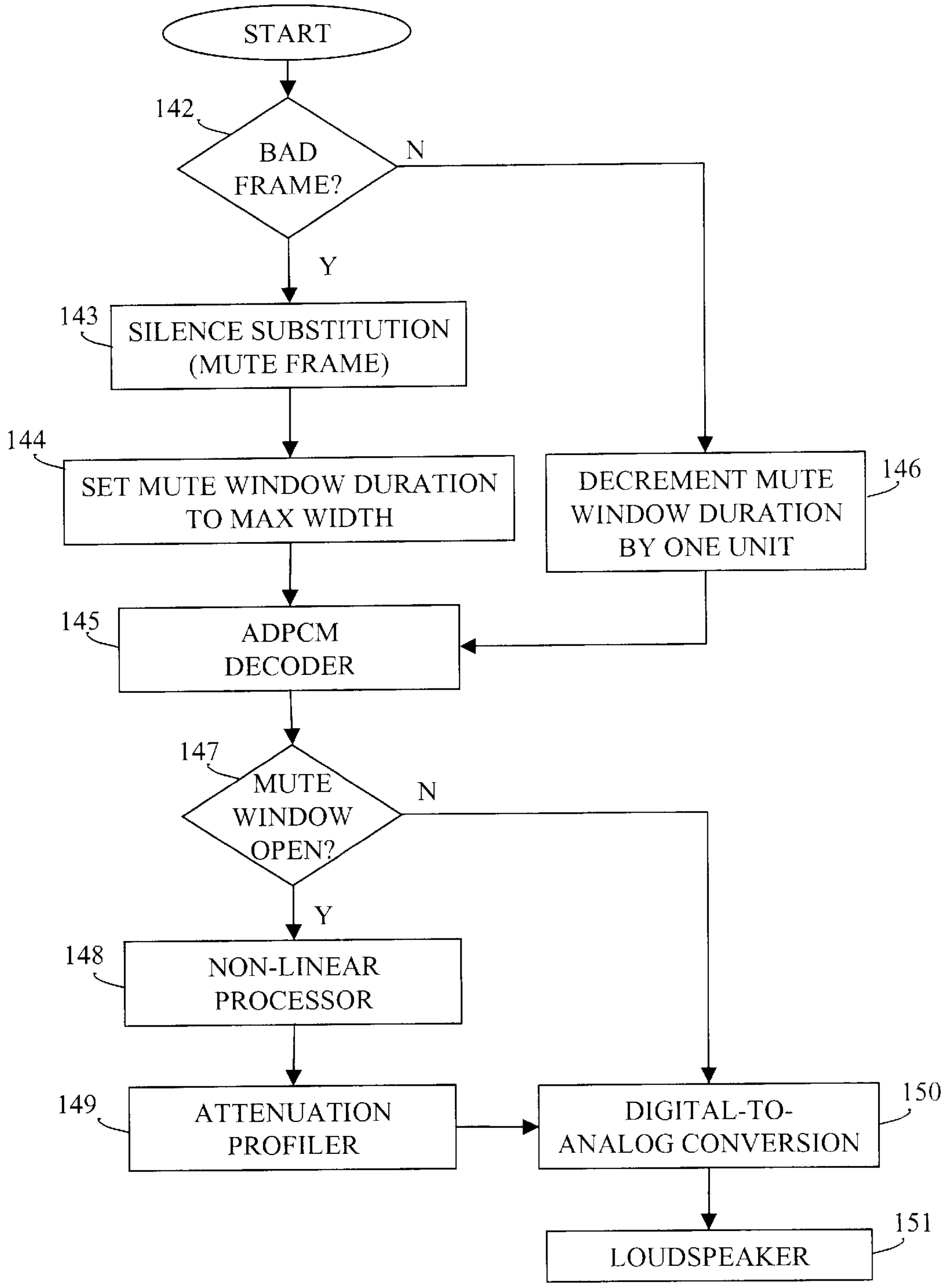
FIG. 12 illustrates an overall method of operation of a receive path in one implementation example of the subject invention.

An overall method of operation of one implementation of an apparatus configured in accordance with the subject invention is illustrated in FIG. 12. As illustrated, upon receipt of a frame, step 142 is performed. In step 142, an inquiry is made regarding whether a bad frame has been detected. If so, in step 143, a predetermined frame is substituted for the error-containing frame. In one embodiment, the substituted frame is a muted frame such as ADPCM-encoded silence.

Then, in step 144, the mute window is opened, and the mute window duration is set to its maximum value. In one implementation, this maximum duration is 2N frames.

Step 145, ADPCM decoding, is then performed on the error-containing frame as well as on subsequent error-free frames.

Turning back to step 142, if a bad frame is not indicated, indicating that a good frame has been received, step 146 is performed. In step 146, the mute window duration is decremented by 1. Step 145, ADPCM decoding, is then performed on the frame.

After step 145, step 147 is performed. In step 147, an inquiry is made to determine if the mute window is still open. If so, in step 148, the decoded frame is passed through the non-linear processor, and in step 149, the programmable attenuation profiler. At this point, in one embodiment, the decoded frame, after passage through the non-linear processor and attenuation profiler, is substituted for the decoded frame not subject to the post-processing.

Turning back to step 147, if the mute window is closed, the decoded frame not subject to post-processing is retained.

Optional steps 150 and 151 are then performed. In optional step 150, the decoded frame, whether or not subject to post-processing as per the previous steps, is passed through a DAC which provides an analog representation of the underlying speech signal. In optional step 151, the analog representation of the speech signal is passed to a loudspeaker.

In an alternate embodiment, steps 148 and 149 are performed on all decoded frames, with the post-processed decoded frames being ignored if the mute window is not open. In this embodiment, as in the processing embodiment, if the mute window is open, the post-processed decoded frames are substituted for the decoded frames not subject to the post-processing.

EXAMPLE 1

In one exemplary implementation, the preferred values for the parameters associated with operation of non-linear processor 116 and attenuation profiler 118 are set forth in Table 1 below:

TABLE 1

| Parameters | Settings |
|---|---|
| β | 2048 |
| A | 1625 |
| B | 0.2087 |
| C | $-3.6 * 10^{-6}$ |
| N | 35 |
| λ | 0.7 |
| A | 0.8333 |
| B | 1.25 |

EXAMPLE 2

In a second example, the subject invention is implemented in a communications systems configured in accordance with the Japanese PHS standard. Some of the characteristics of this standard are provided in the following table:

| | |
|---|---|
| Multiplex scheme | 4 ch. TDMA-TDD |
| Channel bit rate | 384 kbps |
| Frame duration | 5 ms. |
| Time slots | 8 slots per frame (4 up link and 4 down link) |
| ADPCM codec bit rate | 32 kbps |
| Total information bits/slot | 224 bits |
| Slot duration | 62.5 μs. |
| No. bits associated with received ADPCM samples | 160 bits per rx slot or 160 bits/slot/frame |
| Number of bits per uniform PCM sample | 14 |

These parameters differ by degree not in kind from the corresponding parameters for the DECT standard which are summarized in the following table:

| | |
|---|---|
| Multiplex scheme | 12 ch. TDMA-TDD |
| Channel bit rate | 1.152 Mbps |
| Frame duration | 10 ms |
| Time slots | 24 slots per frame (12 for up link, 12 for down link) |
| Total information bits per slot | 420 bits |
| Slot duration | 416.7 μs. |
| Bits associated with received ADPCM samples | 320 bits per rx slot or 320 bits/slot/frame |
| Number of CRC bits associated with the ADPCM bits per rx slot (or per slot/frame) | 4 |
| ADPCM codec rate | 32 kbps |
| Number of bits per uniform PCM sample | 14 |

The application of the subject invention to a communications system configured in accordance with the PHS standard will be readily apparent to one of skill in the art in view of the discussion in the body of this disclosure relating to application of the subject invention to a communications system configured in accordance with the DECT standard.

While particular embodiments and examples of the present invention have been described above, it should be understood that they have been presented by way of example only, and not as limitations. The breadth and scope of the present invention is defined by the following claims and their equivalents, and is not limited by the particular embodiments described herein.

What is claimed is:

1. A method for improving the voice quality of an ADPCM coded signal received by a digital RF receiver comprising the following steps:

(a) generating audio frames of ADPCM code words from said coded signal;

(b) for each said audio frame, detecting whether an error exists in said audio frame;

(c) if an error is detected, muting said frame, decoding said frame with an ADPCM decoder, performing post-processing on the decoded frame and subsequent decoded frames output by said decoder, and supplying said post-processed frames to an output; and (d) if no error is detected, decoding said frame and supplying said decoded frame to the output.

2. A method as claimed in claim 1, wherein the post-processing of step (c) comprises non-linear processing of said decoded frames.

3. A method as claimed in claim 2, wherein step (b) comprises detecting an error from information contained in the frame.

4. A method as claimed in claim wherein said information comprises a cyclic redundancy code word.

5. A method as claimed in claim 2, wherein said non-linear processing comprises companding said decoded frames.

6. A method as claimed in claim 2, wherein said non-linear processing is performed according to the following equation: y=x, if $|x| \leqq \beta$; and $y=\text{sign}(x)*(a+b|x|+cx^2)$, where x is an input signal to said non-linear processor, y is an output signal from said processor, $0<\beta_{min}<\beta<\beta_{max}$, and coefficients a, b and c are non-zero real numbers that are predefined for different levels of desired muting effect.

7. A method as claimed in claim 1, wherein the post-processing of step (c) comprises attenuating said decoded frames.

8. A method as claimed in claim 7, further comprising attenuating said decoded frames at a level which varies as a muting window is progressively closed.

9. A method as claimed in claim 8, further comprising setting said attenuation level to a predetermined level upon receipt of an error-containing frame, incrementing said level by a value δ for each of a first predetermined number of consecutively received error-free frames, and decrementing said level by a value γ for each of a second predetermined number of consecutively received error-free frames.

10. A method as claimed in claim 9, wherein said predetermined level is less than 1.

11. A method as claimed in claim 1 wherein said muting of step (c) comprises substituting ADPCM-encoded silence for the error-containing frame.

12. A method as claimed in claim 1, wherein the post-processing of step (c) comprises non-linear processing and attenuating said decoded frames.

13. A method as claimed in claim 1, further comprising supplying said post-processed frames to the output while a muting window is opened.

14. A method as claimed in claim 13, further comprising opening the window to a nominal maximum duration, and progressively reducing said duration as error-free frames are consecutively received.

15. A method as claimed in claim 14, further comprising closing the window after a predetermined number of error-free frames have been consecutively received.

16. A method as claimed in claim 1, wherein said ADPCM decoder is a G.726 standard compliant decoder.

17. A method for post-processing decoded ADPCM audio frames after an erroneous audio frame has been detected and muted, said method comprising the following steps:

(a) opening a mute window;

(b) providing to an output post-processed decoded frames while the mute window is open;

(c) providing to the output decoded frames not subject to or subject to only part of the post-processing while the mute window is closed; and (d) closing said mute window after at least one frame subsequent to the erroneous frame has been decoded, post-processed, and provided to the output.

18. The method of claim 17 wherein said post-processing comprises non-linear processing of said audio frames.

19. The method of claim 18 wherein said non-linear processing comprises companding said audio frames.

20. The method of claim 17 wherein said post-processing comprises attenuating said audio frames.

21. The method of claim 20 wherein said attenuating comprises attenuating said audio frames at a variable attenuation level.

22. The method as claimed in claim 20, wherein said attenuating further comprises setting an attenuation level to a minimum attenuation level A upon detection of said erroneous audio frame, incrementing said attenuation level a first predetermined value each time an error-free frame is received until the level has reached a maximum attenuation level B, and then decrementing said attenuation level a second predetermined value each time an error-free frame is received until said attenuation level reaches unity.

23. An apparatus for improving the voice quality of an ADPCM coded signal received by a digital RF receiver comprising:

reformatting means for providing frames of ADPCM code words and error detection information from said coded signal;

an ADPCM decoder which receives said frames of ADPCM code words from said reformatting means and generates decoded audio frames;

bad frame detection means for receiving said error detection information from said reformatting means and, responsive thereto, determining whether an error exists; and post-processing means for affecting shaped muting of said decoded audio frames while a muting window is open if said bad frame detection means determines that an error exists.

24. The apparatus of claim 23, wherein said ADPCM decoder is in accordance with the CCITT G.726 standard.

25. The apparatus of claim 23, wherein said post-processing means comprises a non-linear processor and an attenuation profiler.

26. The apparatus of claim 23, wherein the muting window is opened by a predetermined amount when an error-containing frame is detected, and is progressively closed as error-free frames are received.

27. Apparatus for performing error recovery of ADPCM-encoded speech frames comprising:

a detector for detecting an error in a ADPCM-encoded speech frame;

an ADPCM decoder for decoding ADPCM-encoded speech frames;

a substitution block for substituting a first predetermined frame for a second ADPCM-encoded frame responsive to the detector detecting an error in the second frame;

a post-processor for post-processing decoded frames;

a muting window generator for opening a muting window responsive to the detector detecting an error in an ADPCM-encoded frame and closing the window after a predetermined number of error-free frames have been received;

an output; and a switch configured to provide to the output post-processed decoded frames while the muting window is open, and provide to the output decoded frames not subject to or subject to only part of the post-processing while the muting window is closed.

28. The apparatus of claim 27 in which the muting window generator is configured to close the window after a predetermined number of error-free frames have been consecutively received.

29. A method for performing error recovery of ADPCM-encoded speech frames comprising:

decoding ADPCM-encoded speech frames;

substituting a first predetermined frame for a second ADPCM-encoded frame responsive to detecting an error in the second frame;

opening a muting window responsive to detecting an error in an ADPCM-encoded frame;

closing the window after a predetermined number of error-free frames have been received; and providing post-processed decoded frames to an output while the muting window is open, and providing to the output decoded frames not subject to or subject to only part of the post-processing while the muting window is closed.

30. The method of claim 29 further comprising closing the muting window after a predetermined number of error-free frames have been consecutively received.

31. A computer-readable medium embodying a series of instructions executable by a computer for performing a method of error recovery of ADPCM-encoded speech frames, the method comprising the following steps:

decoding ADPCM-encoded speech frames;

substituting a first predetermined frame for a second ADPCM-encoded frame responsive to detecting an error in the second frame;

opening a muting window responsive to detecting an error in an ADPCM-encoded frame;

closing the window after a predetermined number of error-free frames have been received; and providing post-processed decoded frames to an output while a muting window is open, and providing to the output decoded frames not subject to or subject to only part of the post-processing while the muting window is closed.

32. The computer-readable medium of claim 31 in which the method embodied thereon further comprises closing the window after a predetermined number of error-free frames have been consecutively received.

33. The apparatus of claim 27 in which the apparatus comprises a selected one of a cordless handset, wireless handset, PCS device, communications device, a receive path in a communications device, communications systems infrastructure component, mobile communications device, mobile handset, cordless base station, satellite, and wireless base station.

34. A communications system comprising a plurality of mobile units configured to communicate with corresponding ones of a plurality of base stations or satellites over a dispersive channel, at least one such mobile unit, base station or satellite including apparatus for performing error recovery of ADPCM-encoded speech frames comprising:

a detector for detecting an error in a ADPCM-encoded speech frame;

an ADPCM decoder for decoding ADPCM-encoded speech frames;

a substitution block for substituting a first predetermined frame for a second ADPCM-encoded frame responsive to the detector detecting an error in the second frame;

a post-processor for post-processing decoded frames;

a muting window generator for opening a muting window responsive to the detector detecting an error in an ADPCM-encoded frame and closing the window after a predetermined number of error-free frames have been received;

an output; and a switch configured to provide post-processed decoded frames to the output while the muting window is open, and providing to the output decoded frames not subject to or subject to only part of the post-processing while the muting window is closed.

35. The apparatus of claim 34 in which the muting window generator is configured to close the window after a predetermined number of error-free frames have been consecutively received.

* * * * *